United States Patent
Kondo

(12) 
(10) Patent No.: US 6,259,739 B1
(45) Date of Patent: Jul. 10, 2001

(54) MOVING PICTURE VARIABLE BIT RATE CODING APPARATUS, MOVING PICTURE VARIABLE BIT RATE CODING METHOD, AND RECORDING MEDIUM FOR MOVING PICTURE VARIABLE BIT RATE CODING PROGRAM

(75) Inventor: Satoshi Kondo, Yawatashi (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 08/976,449

(22) Filed: Nov. 25, 1997

(30) Foreign Application Priority Data

Nov. 26, 1996 (JP) .................................................. 8-314638

(51) Int. Cl.7 .................................................. H04B 1/66
(52) U.S. Cl. ...................................... 375/240.23; 382/248
(58) Field of Search ..................... 348/405.1, 409.1, 348/419.1, 416.1; 375/240, 240.03, 240.29; 382/248, 250, 251; H04B 1/66

(56) References Cited

U.S. PATENT DOCUMENTS

| 5,629,779 | * | 5/1997 | Jeon | 358/432 |
|---|---|---|---|---|
| 5,731,837 | * | 3/1998 | Hurst, Jr. | 348/405 |
| 5,748,249 | * | 5/1998 | Fujiwara | 348/419 |
| 5,751,358 | * | 5/1998 | Suzuki et al. | 348/405 |
| 5,781,237 | * | 7/1998 | Fukuda | 348/405 |
| 5,799,129 | * | 8/1998 | Muto | 386/111 |
| 5,883,672 | * | 3/1999 | Suzuki et al. | 348/405 |
| 5,999,219 | * | 12/1999 | Yokoyama | 348/405 |
| 6,044,155 | * | 3/2000 | Horike et al. | 375/240 |

* cited by examiner

Primary Examiner—Chris Kelley
Assistant Examiner—Tung Vo
(74) Attorney, Agent, or Firm—Parkhurst & Wendel, L.L.P.

(57) ABSTRACT

A moving picture variable bit rate coding apparatus receives digitized moving pictures and subjects them to coding according to a variable bit rate method using real time processing in response to the input of the pictures. The apparatus performs variable bit rate coding in real time by sequentially performing blocking, conversion processing, quantization processing, and generation of bit streams in response to the input of digitized moving picture data, and setting a quantization scale used for quantization corresponding to a quantity of generated bit streams to perform coding processing and control of quantization in parallel.

31 Claims, 10 Drawing Sheets

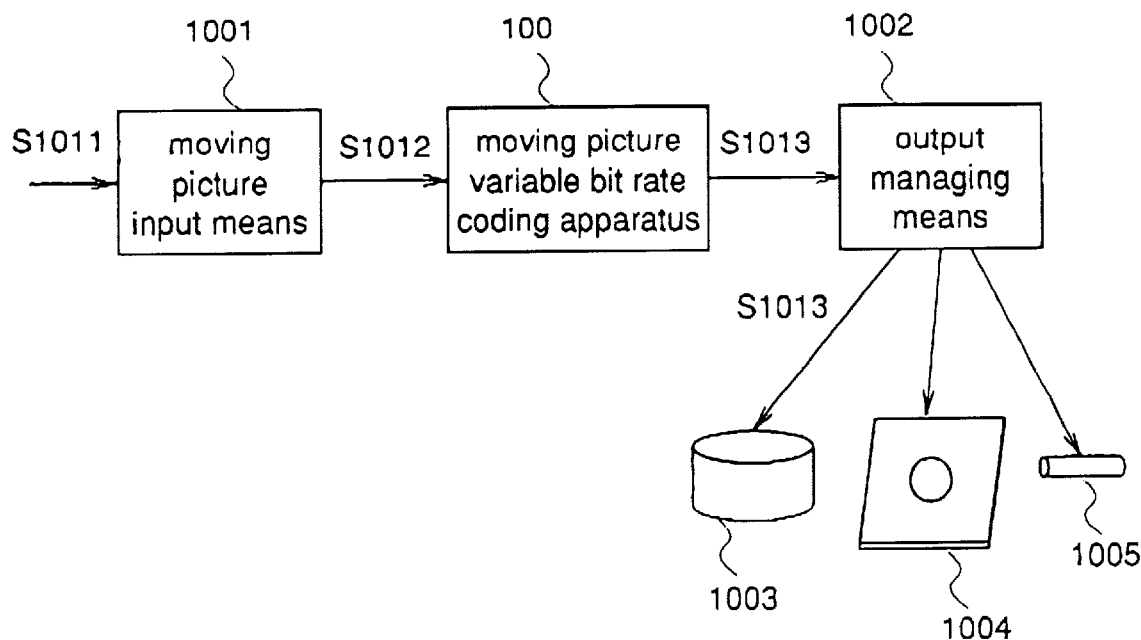

MOVING PICTURE VARIABLE BIT RATE CODING APPARATUS, MOVING PICTURE VARIABLE BIT RATE CODING METHOD, AND RECORDING MEDIUM FOR MOVING PICTURE VARIABLE BIT RATE CODING PROGRAM

FIELD OF THE INVENTION

The present invention relates to a moving picture variable bit rate coding apparatus, a moving picture variable bit rate coding method, and a recording medium for variable bit rate coding program, especially to a moving picture variable bit rate coding apparatus, a moving picture variable bit rate coding method, and a recording medium for moving picture variable bit rate coding program, all capable of coding at a variable bit rate in a real time processing in response to capturing of picture data.

BACKGROUND OF THE INVENTION

Recently, two MPEG methods (Moving Picture Experts Group) are generally used as high-efficient coding methods for moving pictures. In coding moving pictures using either of the two MPEG methods, initially, a blocking processing is performed in which digital picture data corresponding to one picture (one frame) is divided into 16×16 macroblocks, and each macroblock is subdivided into 8×8 blocks. Each block is subjected to discrete cosine transform to obtain a discrete cosine transform coefficient (DCT). Next, a quantization processing is performed in which the obtained transform coefficient is divided by a quantization scale and a 8 by 8 quantization matrix corresponding to each frequency component, to generate a quantized transform coefficient. Then, the quantized transform coefficient is subjected to variable length coding to obtain a bit stream which is coded data as the result of the coding.

In such a series of processings, a value of a quantization scale used for the quantization processing highly affects a compression ratio in the coding processing: the larger the value of the quantization scale, the higher the compression ratio, resulting in reduced quantity of coded data; the smaller the value, the lower the compression ratio, resulting in an increased quantity of coded data. The value of the quantization scale can be set and changed in unit of macroblock of the data as a processing object, thereby controlling the generated code quantity.

FIG. 11 is a diagram for explaining relations among a bit rate as a data transmission rate, a quantization scale, a generated code quantity, an allocated code quantity per frame, and a play-back picture quality. Since the quantization processing is fundamentally a division processing as described above, a generated code quantity decreases as a quantization scale increases, whereby a bit rate as a transmission rate is reduced. In this case, since an allocated code quantity per frame increases, a superior play-back picture quality of coded data is available. In contrast with the case, when the quantization scale is smaller, the quantity of allocated code is reduced because a larger quantity of code and a higher bit rate area available, resulting in degraded picture quality of coded data.

Here provided as a control method for a generated code quantity which is used in MPEG2 TEST MODEL3 is a fixed bit rate method in which the generated code quantity is controlled in GOP (Group of Picture) units so that the quantity is held constant.

As described above, when the bit rate is high, a better picture quality is available despite of low compression rate, which is desirable to dynamic moving pictures, complicated moving pictures, i.e., moving pictures having a large amount of information. On the other hand, in static moving pictures, simple moving pictures, i.e., moving pictures having a small amount of information, the degradation of picture quality caused by high compression rate is not recognized explicitly, and thus it is possible to obtain coded data with a high compression rate by decreasing a bit rate and to reduce a processing burden for a device for use.

In fixed bit rate method, since the bit rate is controlled to a prescribed value (a set rate), it is possible to easily perform a real time processing in response to capturing of moving pictures by setting a bit rate corresponding to a property of a moving picture and a processing performance of a device.

However, in the fixed bit rate coding, an uniform quantity of code is allocated not only to coding objects having a small amount of information but to those having a large amount of information, in spite of a fact that motion scale and complexity of moving pictures are variable.

Therefore, if a set rate is smaller than expected, visual degradation of picture quality occurs in pictures having a large amount of information. With a high set rate, although the degradation of picture quality is prevented, extra quantity of code is allocated to a picture having a small amount of information, resulting in reduced coding efficiency. This leads to a problem that in the case of recording bit streams into a recording medium, a reproduction time for the recorded moving picture data, that is, a recording time becomes shorter. Further, if this method is applied to a picture whose picture quality is not affected even if the picture is further compressed, unnecessary data is processed and recorded due to an excessively low compression rate for this picture, whereby the device resource of a coding apparatus and recording medium cannot be used efficiently in this coding.

To solve the above-described problems, Japanese Patent Application Number Hei. 6-141298 provides a coding apparatus using a variable bit rate method which intends to improve picture quality without reducing coding efficiency by controlling a generated code quantity by controlling a set rate in unit times such that a total quantity of code in a moving picture has a prescribed value. In a variable bit rate coding apparatus according to such prior art technique, an input picture is subjected to two coding processing in total. Initially, as a first coding processing to an input picture, provisional coding is performed using a fixed quantization scale. For a bit stream generated by the provisional coding, a generated code quantity is computed in unit times and the result is stored as a provisional transmission rate. Then, based on the provisional transmission rate, desired transmission rate is set such that a total code quantity in an input picture has a given value. Next, as a second coding processing to the input picture, real coding is performed controlling a generated code quantity corresponding to a desired transmission rate per unit time.

This processing enables to use a transmission rate corresponding to a property of a moving picture as a coding object, thereby optimizing both picture quality and coding efficiency which the above-described fixed bit rate coding cannot.

As described above, in the coding processing or moving picture according to the prior art technique, using a fixed bit rate method enables to perform coding in a real time processing in response to the input of a moving picture and record the result of the coding. However, the coding processing with a fixed bit rate cannot correspond to the property of the moving picture, and might degrade picture quality and coding efficiency by changing a property of moving picture.

This variable bit rate coding is provided to solve these problems, and can improve both picture quality and coding efficiency by performing a provisional coding for setting an appropriate bit rate and a real coding performed on the basis of the appropriate bit rate in combination.

Nevertheless, the conventional variable bit rate coding apparatus needs two coding operations to obtain bit streams, and thus at least a time twice as long as a total time length of a moving picture is required. Further, since every moving picture is subjected to provisional coding before real coding, a storage unit, such as a memory, has to have a large capacity, and a high-performance control unit is required. In addition, since two coding processings are performed, it is impossible to perform real time processing in response to an input of a moving picture.

Performing real time processing and recording in response to capturing of moving pictures or the like with ease with general device performance is necessary for general users at home to record multimedia data including moving pictures into high-capacity recording media including a DVD, which is becoming common now, and utilize it, by means of inexpensive, consumer audio-visual appliances or a combination of such AV appliances and a consumer personal computer. Therefore, the conventional variable bit rate coding method incapable of real time processing and requiring larger memory capacity and higher processing performance is not a suitable coding method, and if using this coding method, it is not possible to improve both picture quality and coding efficiency.

SUMMERY OF THE INVENTION

An object of the present invention is to provide a moving picture variable bit rate coding apparatus for coding moving picture in a real time processing in response to the input of the moving picture, thereby obtaining an improved coding result compressed in high compression rate and a better play-back picture quality.

Another object of the present invention is to provide a moving picture variable bit rate coding method capable of obtaining a coding result compressed in high compression ratio and having improved picture quality by coding moving pictures in real time processing by means of inexpensive, consumer AV appliances or a combination of such AV appliances and a personal computer.

Still another object of the present invention is to provide a recording medium for moving picture variable bit rate coding program, the program implementing a moving picture variable bit rate coding apparatus capable of obtaining a coding result compressed in high compression ratio and having improved play-back picture quality by coding moving pictures in a real time processing by means of a multimedia type personal computer system or a combination of inexpensive, consumer AV appliances and a personal computer system.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a 1st aspect of the present invention, a moving picture variable bit rate coding apparatus receives digitized moving pictures and subjects the pictures to a coding processing according to a variable bit rate method, in a real time processing in response to the input of the pictures, to generate bit streams, and this coding apparatus comprises: a blocking means for dividing each picture included in the input moving picture into blocks to generate blocked data: a picture conversion means for subjecting the blocked data to conversion processing to generate a conversion coefficient; a quantization means for performing quantization processing to the conversion coefficient using a quantization scale to generate a quantized conversion coefficient; a bit stream generating means for generating bit stream from the quantized conversion coefficient; and a code quantity control means for setting a function for control, using a generated code quantity which is a quantity of bit stream generated in a unit time and an average quantization scale obtained as a value indicating an average of the quantization scales per unit time, and, by arithmetic operation using the set function, obtaining a quantization scale to be used for the quantization processing and then outputting the quantization scale to the quantization means. This coding apparatus can perform variable bit rate coding in real time by performing blocking, conversion processing, quantization processing, and generation of bit streams sequentially in response to the input of digitized moving picture data, and setting a quantization scale used for the quantization processing corresponding to a quantity of generated bit stream to perform coding processing and control of quantization in parallel.

According to a 2nd aspect of the present invention, in the moving picture variable bit rate coding apparatus defined in the 1st aspect, the code quantity control means comprises: a code quantity counting means for obtaining a generated code quantity by counting a quantity of code generated in each picture included in the moving picture based on the bit streams generated by the bit stream generating means: an average quantization scale calculating means for obtaining an average quantization scale of each picture from the quantization scales used for the quantization; a unit time information calculating means for obtaining a generated code quantity per unit time S1 and an average quantization scale per unit time Q1, using the generated code quantity and the average quantization scale; a first function setting means for setting a function $f:S=f(Q)$ which indicates a relation between a generated code quantity per unit time (S) and an average quantization scale per unit time (Q), before the coding is started; a second function setting unit for setting a function $g:S=g(Q)$ which passes through a point (S1, Q1), using the generated code quantity per unit time S1 and the average quantization scale per unit time Q1; and a quantization scale deciding means for obtaining a value of Q which satisfies the both functions f and g, using the generated code quantity per unit time S1 and the average quantization scale per unit time Q1, and outputting the value of Q to the quantization means as a quantization scale. By processing the data of a frame as a coding object using the Q decided in the above-described method, this apparatus can perform variable bit rate coding in real time by performing coding processing in response to the input of digitized moving picture data and performing coding processing and control of quantization scale in parallel.

According to a 3rd aspect of the present invention, in the moving picture variable bit rate coding apparatus defined in the 1st aspect, the code quantity control means comprises: a code quantity counting means for obtaining a generated code quantity by counting a quantity of code generated in each picture included in the moving picture based on the bit streams generated by the bit stream generating means; an average quantization scale calculating means for obtaining an average quantization scale of each picture from the quantization scales used for the quantization; a unit time information calculating means for obtaining a generated code quantity per unit time S1 and an average quantization scale per unit time Q1, using the generated code quantity and the average quantization scale; a first function setting means for setting a function f:S=f(Q) which indicates a relation between a generated code quantity per unit time (S) and an average quantization scale per unit time (Q), before the coding is started; a second function setting means for setting a function g:S=g(Q) which passes through a point (S1, Q1), using the generated code quantity per unit time S1 and the average quantization scale per unit time Q1, and then setting a function h represented as a tangent being tangent to the function g at the point (S1, Q1); and a quantization scale deciding means for obtaining a value of Q which satisfies the both functions f and h, from the generated code quantity per unit time S1 and the average quantization scale per unit time Q1, and outputting the value of Q to the quantization means as a quantization scale. By performing processing with the Q decided in the above-described method with less operation amount as a quantization scale, this apparatus can perform variable bit rate coding in real time by carrying out coding processing in response to the input of digitized moving picture data and performing the coding processing and control of quantization scale with less process burden in parallel.

According to a 4th aspect of the present invention, in the moving picture variable bit rate coding apparatus defined in the 1st aspect, the code quantity control means comprises: a target bit rate setting means for setting a target bit rate which is a bit rate as a target in the coding apparatus, until the coding processing is started; a generated bit rate calculating means for obtaining a generated bit rate which is a bit rate for generated bit streams based on the bit streams generated by the bit stream generating means; a code quantity counting means for obtaining a generated code quantity by counting a quantity of code generated in each picture included in the moving picture based on the bit streams generated by the bit stream generating means; an average quantization scale calculating means for obtaining an average quantization scale of each picture from the quantization scales used for the quantization; a unit time information calculating means for obtaining a generated code quantity per unit time S1 and an average quantization code per unit time Q1, using the generated code quantity and the average quantization scale; a first function setting means for setting a function f:S=f(Q) which indicates a relation between a generated code quantity per unit time (S) and an average quantization scale per unit time (Q), before the coding is started, and then changing the set function corresponding to a difference between the target bit rate and the generated bit rate; a second function setting means for setting a function g:S=g(Q) which passes through a point (S1, Q1) from the generated code quantity per unit time S1 and the average quantization scale per unit time Q1 which are both the outputs of the unit time information calculating means; and a quantization scale deciding means for obtaining a value of Q which satisfies both the function f set by the first function setting means and the function g set by the second function setting means using the generated code quantity per unit time S1 and the average quantization scale per unit time Q1, and then outputting the value of Q to the quantization means as a quantization scale. By performing processing with the Q decided in the above-described method as a quantization scale, this apparatus can perform variable bit rate coding in real time by carrying out coding processing in response to the input of digitized moving picture data, and performing the coding processing and control of quantization scale in parallel while controlling bit rate so that the bit rate can reach a target bit rate in total.

According to a 5th aspect of the present invention, in the moving picture variable bit rate coding apparatus defined in the 1st aspect, the code quantity control means sets a function f such that $f(Q1) \leq f(Q2)$ when $Q1<Q2$, as a function f:S=f(Q) which indicates a relation between a generated code quantity per unit time (S) and an average quantization scale per unit time (Q). Therefore, it is possible to obtain an appropriate value by arithmetic operation reflecting a proportional relationship between generated code quantity and quantization scale.

According to a 6th aspect of the present invention, in the moving picture variable bit rate coding apparatus defined in the 1st aspect, the code quantity control means sets a function g such that $g(Q1) \leq g(Q2)$ when $Q1<Q2$, as a function g:S=g(Q) which passes through a point (S1, Q1) obtained from a generated code quantity per unit time S1 and an average quantization scale per unit time Q1 which are obtained. Therefore, it is possible to obtain an appropriate value by arithmetic operation reflecting a proportional relationship between generated code quantity and quantization scale.

According to a 7th aspect of the present invention, in the moving picture variable bit rate coding apparatus defined in the 1st aspect, the code quantity control means sets a function $f(Q)=a \times Q+b$ (a is an integral real number, and b is a real number) which is expressed as a straight line, as a function f:S=f(Q) which indicates a relation between a generated code quantity per unit time (S) and an average quantization scale per unit time (Q). Therefore, it is possible to obtain an appropriate value by arithmetic operation using a function expressed as a straight line which reflects a relation between generated code quantity and quantization scale.

According to an 8th aspect of the present invention, in the moving picture variable bit rate coding apparatus defined in the 4th aspect, the code quantity control means sets a function $f(Q)=a \times Q+b$ (a is an integral real number and b is a real number), as a function f:S=f(Q) which indicates a generated code quantity per unit time (S) and an average quantization scale per unit time (Q), and changes the setting of the function f such that the slope of the function f is increased when the target bit rate is larger than the generated bit rate while changing the setting of the function f such that the slope of the function f is decreased when the target bit rate is smaller than the generated bit rate. Therefore, it is possible to a bit rate reaching as close to possible to a target bit rate by controlling function setting corresponding to a difference between a target bit rate and a generated bit rate.

According to a 9th aspect of the present invention, in the moving picture variable bit rate coding apparatus defined in the 1st aspect, assuming that a constant Q1 is smaller than a constant Q2, a constant S1 is smaller than a constant S2, and S1=f(Q1) and S2=f(Q2), the code quantity control means sets a function f such that f(Q)=S1 when Q<Q1 and $f(Q)=(S2-S1)/(Q2-Q1) \times Q+(S1 \times Q2-S2 \times Q1)/(Q2-Q1)$ when $Q1 \leq Q \leq Q2$, as a function f:S=f(Q) indicating a relation between a generated code quantity per unit time (S) and an average quantization scale per unit time (Q). Therefore it is possible to ensure prescribed limits of bit rate and to obtain an appropriate value, by means of arithmetic operation using a function expressed as a straight line which reflects a relation between generated code quantity and quantization scale.

According to a 10th aspect of the present invention, in the moving picture variable bit rate coding apparatus defined in the 1st aspect, a function $g(Q)=Q1 \times S1/Q$ expressed as a hyperbola is set as a function $g:S=g(Q)$ passing through a point (S1, Q1) obtained from a generated code quantity per unit time S1 and an average quantization scale per unit time Q1 which are obtained. Therefore, it is possible to obtain appropriate value by arithmetic operation reflecting a relation between generated code quantity and quantization scale.

According to an 11th aspect of the present invention, the moving picture variable bit rate coding apparatus defined in the 1st aspect further comprises a signal input means for inputting signals including moving pictures from the exterior to said apparatus, and an output managing means for controlling the storage of the bit streams into a storage unit. Therefore, this apparatus can not only perform real time processing to moving pictures input by means of TV signals, but perform a variable bit rate coding which implements superior picture quality and store the result of the coding to a storage unit.

A moving picture variable bit rate coding method according to a 12th aspect of the present invention is a moving picture variable bit rate coding method in which digitized moving pictures are received and subjected to a coding processing according to a variable bit rate method in a real time processing in response to the input of the pictures, and this coding method includes: a blocking step of dividing each picture included in the input moving picture into blocks to generate blocked data; a picture conversion step of performing conversion processing to the blocked data to generate a conversion coefficient; a quantization step of performing quantization processing to the conversion coefficient using a quantization scale to generate a quantized conversation coefficient; a bit stream generating step of generating bit stream from the quantized conversion coefficient; and a code quantity control step of setting a function for control, using a generated code quantity which is a quantity of bit stream generated in a unit time and an average quantization scale obtained as a value indicating an average of the quantization scales per unit time, and by arithmetic operation using the set function, obtaining a quantization scale to be used for the quantization and outputting the scale to the quantization step. This coding method enables to perform variable bit rate coding in real time by sequentially performing blocking, conversion processing, quantization processing, and generation of bit streams in response to the input of digitized moving picture data, and setting a quantization scale used for the quantization processing corresponding to a quantity of generated bit stream to perform coding processing and control of quantization in parallel.

According to a 13th aspect of the present invention, in the moving picture variable bit rate coding method defined in the 12th aspect, the code quantity control step includes: a code quantity counting step of obtaining a generated code quantity by counting a quantity of code generated in each picture included in the moving picture based on the bit streams generated by the bit stream generating step; an average quantization scale calculating step of obtaining an average quantization scale of each picture from the quantization scales used for the quantization; a unit time information calculating step of obtaining a generated code quantity per unit time S1 and an average quantization scale per unit time Q1 using the generated code quantity and the average quantization scale; a first function setting step of setting a function $f:S=f(Q)$ indicating a relation between a generated code quantity per unit time (S) and an average quantization scale per unit time (Q) before the coding is started; a second function setting step of setting a function $g:S=g(Q)$ passing through a point (S1, Q1), using a generated code quantity per unit time S1 and an average quantization scale per unit time Q1; and a quantization scale deciding step of obtaining a value of Q which satisfies the both functions f and g, using the generated code quantity per unit time S1 and the average quantization scale per unit time Q1, and outputting the value of Q to the quantization step as a quantization scale. By processing the data of a frame as a coding object using the Q decided in the above-descried method, this method enables to perform variable bit rate coding in real time by performing coding processing in response to the input of digitized moving picture data, and performing coding processing and control of quantization scale in parallel.

According to a 14th aspect of the present invention, in the moving picture variable bit rate coding method defined in the 12th aspect, the code quantity control step includes: a code quantity counting step of obtaining a generated code quantity by counting a quantity of code generated in each picture included in the moving picture based on the bit streams generated by the bit stream generating step; an average quantization scale calculating step of obtaining an average quantization scale of each picture from the quantization scales used for the quantization; a unit time information calculating step of obtaining a generated code quantity per unit time S1 and an average quantization scale per unit time Q1 using the generated code quantity and the average quantization scale; a first function setting step of setting a function $f:S=f(Q)$ which indicates a relation between a generated code quantity per unit time (S) and an average quantization scale per unit time (Q), before the coding is started; a second function setting step of setting a function $g:S=g(Q)$ which passes through a point (S1, Q1) using the generated code quantity per unit time S1 and the average quantization scale per unit time Q1, and then setting a function h expressed as a tangent which is tangent to the function g at the point (S1, Q1); and a quantization scale deciding step of obtaining a value of Q which satisfies the both functions f and h using the generated code quantity per unit time S1 and the average quantization scale per unit time Q1, and then outputting the value of Q to the quantization step as a quantization scale. By performing processing with the Q decided in the above-described method with less operation amount as a quantization scale, this method enables to perform variable bit rate coding in real time by carrying out coding processing in response to the input of digitized moving picture data, and performing the coding processing and control of quantization scale with less process burden in parallel.

According to a 15th aspect of the present invention, in the moving picture variable bit rate coding method defined in the 12th aspect, the code quantity control step includes: a target bit rate calculating step of setting a target bit rate, which is a bit rate as a target in the coding method, before the coding is started; a generated bit rate calculating step of obtaining a generated bit rate, which is a bit rate for generated bit stream, from the bit streams generated by the bit stream generating means; a code quantity calculating step of obtaining a generated code quantity by counting a quantity of code generated in each picture included in the moving picture based on the bit streams generated in the bit stream generating step; an average quantization scale calculating step of obtaining an average quantization scale of each picture from the quantization scales used for the quantization; a unit time information calculating step of obtaining a generated code quantity per unit time S1 and an average quantization scale per unit time Q1 using the generated code quantity and the average quantization scale; a first function setting step of setting a function f:S=f(Q) which indicates a relation between a generated code quantity per unit time (S) and an average quantization scale per unit time (Q), before the coding is started, and then changing the set function corresponding to a difference between the target bit rate and the generated bit rate; a second function setting step of setting a function g:S=g(Q) passing through a point (S1, Q1), from the generated code quantity per unit time S1 and the average quantization scale per unit time Q1 which are both the outputs of the unit time information calculating step; and a quantization scale deciding step of obtaining a value of Q which satisfies the both functions f and g using the generated code quantity per unit time S1 and the average quantization scale per unit time Q1, and then outputting the value of Q to the quantization step as a quantization scale. By performing processing with the Q decided in the above-described method as a quantization scale, this method can perform variable bit rate coding in real time by carrying out coding processing in response to the input of digitized moving picture data, and performing the coding processing and control of quantization scale in parallel while controlling bit rate so that the bit rate can reach a target bit rate in total.

According to a 16th aspect of the present invention, in the moving picture variable bit rate coding method defined in the 12th aspect, in the code quantity control step, a function f is set such that f(Q1)≦f(Q2) when Q1<Q2, as a function f:S=f(Q) indicating a relation between a generated code quantity per unit time (S) and an average quantization scale per unit time (Q). Therefore, it is possible to obtain an appropriate value by arithmetic operation reflecting a proportional relationship between generated code quantity and quantization scale.

According to a 17th aspect of the present invention, in the moving picture variable bit rate coding method defined in the 12th aspect, in the code quantity control step, a function g is set such that g(Q1)≦g(Q2) when Q1<Q1, as a function g:S=g(Q) passing through a point (S1, Q1) obtained from a generated code quantity per unit time S1 and an average quantization scale per unit time Q1 which are obtained. Therefore, it is possible to obtain an appropriate value by arithmetic operation reflecting a proportional relationship between generated code quantity and quantization scale.

According to an 18th aspect of the present invention, in the moving picture variable bit rate coding method defined in the 12th aspect, in the code quantity control step, a function f(Q)=a×Q+b (a is an integral real number, and b is a real number) expressed as a straight line is set as a function f:S=f(Q) indicating a relation between a generated code quantity per unit time (S) and an average quantization scale per unit time (Q). Therefore, it is possible to obtain an appropriate value by arithmetic operation using a function expressed as a straight line which reflects a relation between generated code quantity and quantization scale.

According to a 19th aspect of the present invention, in the moving picture variable bit rate coding method defined in the 15th aspect, in the code quantity control step, a function $f(Q)=a \times Q+b$ (a is an integral real number, and b is a real number) expressed as a straight line is set as a function f:S=f(Q) indicating a relation between a generated code quantity per unit time (S) and an average quantization scale per unit time (Q), and changes the setting of the function f such that the slope of the function f is increased when the target bit rate is larger than the generated bit rate while changing the setting of function f such that the slope of the function f is decreased when the target bit rate is smaller than the generated bit rate. Therefore, it is possible to obtain a bit rate reaching as close as possible to a target bit rate by controlling function setting corresponding to a difference between a target bit rate and a generated bit rate.

According to a 20th aspect of the present invention, in the moving picture variable bit rate coding method defined in the 12th aspect, assuming that a constant Q1 is smaller than a constant Q2, a constant S1 is smaller than a constant S2, and S1=f(Q1) and S2=f(Q2), a function f is set such that f(Q)–S1 when Q<Q1 and $f(Q)=(S2-S1)/(Q2-Q1) \times Q+(S1 \times Q2-S2 \times Q1)/(Q2-Q1)$ when Q1≦Q≦Q2, as a function f:S=f(Q) indicating a relation between a generated code quantity per unit time (S) and an average quantization scale per unit time (Q). Therefore it is possible to ensure prescribed limits of bit rate, and to obtain an appropriate value, by means of arithmetic operation using a function expressed as a straight line which reflects a relation between generated code quantity and quantization scale.

According to a 21st aspect of the present invention, in the moving picture variable bit rate coding method defined in the 12th aspect, in the code quantity control step, a function $g(Q)=Q1 \times S1/Q$ expressed as hyperbola is set as a function g:S=g(Q) which passes through a point (S1, Q1) obtained from a generated code quantity per unit time S1 and an average quantization scale per unit time Q1 which are obtained. Therefore, it is possible to obtain appropriate value by arithmetic operation reflecting a relation between generated code quantity and quantization scale.

According to a 22nd aspect of the present invention, a recording medium for moving picture variable bit rate coding program is used to record a moving picture variable bit rate coding program which receives digitized moving pictures and subjects the pictures to a coding processing according to a variable bit rate method, in a real time processing in response to the input of the pictures, to generate bit streams, which program comprises: a blocking step of dividing each picture included in the input moving picture into blocks to generate blocked data; a picture conversion step of performing conversion processing to the blocked data to generate a conversion coefficient; a quantization step of performing quantization processing to the conversion coefficient using a quantization scale to generate a quantized conversation coefficient; a bit stream generating step of generating bit streams from the quantized conversion coefficient; and a code quantity control step of setting a function for control using a generated code quantity as a quantity of bit stream generated in a unit time and an average quantization scale obtained as a value indicating an average of the quantization scales per unit time, and by arithmetic operation using the set function, obtaining a quantization scale to be used for the quantization and outputting the scale to the quantization step. Executing this coding program by means of a computer system or the like enables to perform variable bit rate coding in real time by sequentially performing blocking, conversion processing, quantization processing, and generation of bit streams in response to the input of digitized moving picture data, and setting a quantization scale used for the quantization processing corresponding to a quantity of generated bit stream to perform coding processing and control of quantization in parallel.

According to a 23rd aspect of the present invention, the recording medium for moving picture variable bit rate coding program defined in the 22nd aspect is used to record the moving picture variable bit rate coding program in which the code quantity control step includes: a code quantity counting step of obtaining a generated code quantity by counting the quantity of code generated in each picture included in the moving picture based on the bit streams generated by the bit stream generating step; an average quantization scale calculating step of obtaining an average quantization scale of each picture from the quantization scales used for the quantization; a unit time information calculating step of obtaining a generated code quantity per unit time S1 and an average quantization scale per unit time Q1 using the generated code quantity and the average quantization scale; a first function setting step of setting a function f:S=f(Q) indicating a relation between a generated code quantity per unit time (S) and an average quantization scale per unit time (Q) before the coding is started; a second function setting step of setting a function g:S=g(Q) passing through a point (S1, Q1), using the generated code quantity per unit time S1 and the average quantization scale per unit time Q1; and a quantization scale deciding step of obtaining a value of Q which satisfies the both functions f and g using the generated code quantity per unit time S1 and the average quantization scale per unit time Q1, and outputting the value of Q to the quantization step as a quantization scale. By performing processing to the data of a frame as a coding object using the Q decided in the above-described method, this coding program, executed by a computer system or the like, enables to perform variable bit rate coding in real time by performing coding processing in response to the input of digitized moving picture data, and performing coding processing and control of quantization scale in parallel.

According to a 24the aspect of the present invention, the recording medium for moving picture variable bit rate coding program defined in the 22nd aspect is used to record the moving picture variable bit rate coding program in which the code quantity control step includes: a code quantity counting step of obtaining a generated code quantity by counting a quantity of code generated in each picture included in the moving picture based on the bit streams generated by the bit stream generating step; an average quantization scale calculating step of obtaining an average quantization scale of each picture from the quantization scales used for the quantization; a unit time information calculating step of obtaining a generated code quantity per unit time S1 and an average quantization scale per unit time Q1 using the generated code quantity and the average quantization scale; a first function setting step of setting a function f:S=f(Q) which indicates a relation between a generated code quantity per unit time (S) and an average quantization scale per unit time (Q), before the coding is started; a second function setting step of setting a function g:S=g(Q) which passes through a point (S1, Q1) using a generated code quantity per unit time S1 and an average quantization scale per unit time Q1, and then setting a function h expressed as a tangent which is tangent to the function g at the point (S1, Q1); and a quantization scale deciding step of obtaining a value of Q which satisfies the both functions f and h using the generated code quantity per unit time S1 and the average quantization scale per unit time Q1, and then outputting the value of Q to the quantization step as a quantization scale. By performing processing with the Q decided in the above-described method with less operation amount as a quantization scale, this coding program, executed by computer system or the like, enables to perform variable bit rate coding in real time by carrying out coding processing in response to the input of digitized moving picture data, and performing the coding processing and control of quantization scale with less process burden in parallel.

According to a 25th aspect of the present invention, the recording medium for moving picture variable bit rate coding program defined in the 22nd aspect is used to record the moving picture variable bit rate coding program in which the code quantity control step includes: a target bit rate calculating step of setting a target bit rate, which is a bit rate desired to be obtained in the coding method, before the coding is started; a generated bit rate calculating step of obtaining a generated bit rate, which is a bit rate for generated bit stream, from the bit streams generated by the bit stream generating means; a code quantity calculating step of obtaining a generated code quantity by counting a quantity of code generated in each picture included in the moving picture based on the bit streams generated in the bit stream generating step; an average quantization scale calculating step of obtaining an average quantization scale of each picture from the quantization scales used for the quantization; a unit time information calculating step of obtaining a generated code quantity per unit time S1 and an average quantization scale per unit time Q1 using the generated code quantity and the average quantization scale; a first function setting step of setting a function f:S=f(Q) which indicates a relation between a generated code quantity per unit time (S) and an average quantization scale per unit time (Q), before the coding is started, and then changing the set function corresponding to a difference between the target bit rate and the generated bit rate; a second function setting step of setting a function g:S=g(Q) passing through a point (S1, Q1), from the generated code quantity per unit time S1 and the average quantization scale per unit time Q1 which are both the outputs of the unit time information calculating step; and a quantization scale deciding step of obtaining a value of Q which satisfies the both functions f and g using the generated code quantity per unit time S1 and the average quantization scale per unit time Q1, and then outputting the value of Q to the quantization step as a quantization scale. By performing processing with the Q decided in the above-described method as a quantization scale, this coding program, executed by a computer system or the like, enables to perform variable bit rate coding in real time by carrying out coding processing in response to the input of digitized moving picture data, and performing the coding processing and control of quantization scale in parallel while controlling bit rate so that the bit rate can reach a target bit rate in total.

According to a 26th aspect of the present invention, the recording medium for moving picture variable bit rate coding program defined in the 22nd aspect is used to record the moving picture variable bit rate coding program wherein, in the code quantity control step, a function f is set such that $f(Q1) \leq f(Q2)$ when $Q1 < Q2$, as a function f:S=f(Q) indicating a relation between a generated code quantity per unit time (S) and an average quantization scale per unit time (Q). Executing this coding program by a computer system or the like enables to obtain an appropriate value by arithmetic operation reflecting a proportional relationship between generated code quantity and quantization scale.

According to a 27th aspect of the present invention, the recording medium for moving picture variable bit rate coding program defined in the 22nd aspect is used to record the moving picture variable bit rate coding program wherein, in the code quantity control step, a function g is set such that $g(Q1) \leq g(Q2)$ when $Q1 < Q2$, as a function g:S=g(Q) which passes through a point (S1, Q1) obtained from a generated code quantity per unit time S1 and an average quantization scale per unit time Q1 which are obtained. Executing this coding program by a computer system or the like enables to obtain an appropriate value by arithmetic operation reflecting a proportional relationship between generated code quantity and quantization scale.

According to a 28th aspect of the present invention, the recording medium for moving picture variable bit rate coding program defined in the 22nd aspect is used to record the moving picture variable bit rate coding program wherein, in the code quantity control step, a function $f(Q)= a \times Q+b$ (a is an integral real number, and b is a real number) expressed as a straight line is set as a function f:S=f(Q) indicating a relation between a generated code quantity per unit time (S) and an average quantization scale per unit time (Q). Executing this coding program by a computer system or the like enables to obtain an appropriate value by arithmetic operation using a function expressed as a straight line which reflects a relation between generated code quantity and quantization scale.

According to a 29th aspect of the present invention, the recording medium for moving picture variable bit rate coding program defined in the 25th aspect is used to record the moving picture variable bit rate coding program wherein, in the code quantity control step, a function $f(Q)= a \times Q+b$ (a is an integral real number, and b is a real number) expressed as a straight line is set as a function f:S=f(Q) indicating a relation between a generated code quantity per unit time (S) and an average quantization scale per unit time (Q), and the setting of the function f is changed such that the slope of the function f is increased when the setting of the target bit rate is larger than the generated bit rate while the function f is changed such that the slope of the function f is decreased when the target bit rate is smaller than the generated bit rate. Executing this coding program by a computer system or the like enables to obtain a bit rate reaching as close as possible to a target bit rate by controlling function setting corresponding to a difference between a target bit rate and a generated bit rate.

According to a 30th aspect of the present invention, the recording medium for moving picture variable bit rate coding program defined in the 22nd aspect is used to record the moving picture variable bit rate coding program wherein, in the code quantity control step, assuming that a constant Q1 is smaller than a constant Q2, a constant S1 is smaller than a constant S2, and S1=f(Q1) and S2=f(Q2), a function f is set such that f(Q)=S1 when Q<Q1 and $f(Q)= (S1-S1)/(Q2-Q1) \times Q+(S \times Q2-S2 \times Q1)/(Q2-Q1)$ when $Q1 \leq Q \leq Q2$, as a function f:S=f(Q) indicating a relation between a generated code quantity per unit time (S) and an average quantization scale per unit time (Q). Executing this coding program by a computer system or the like enables to ensure prescribed limits of bit rate, and to obtain an appropriate value, by means of arithmetic operation using a function expressed as a straight line which reflects a relation between generated code quantity and quantization scale.

According to a 31st aspect of the present invention, the recording medium for moving picture variable bit rate coding program defined in the 22th aspect is used to record the moving picture variable bit rate coding program wherein, in the code quantity control step, a function $g(Q)= Q1 \times S1/Q$ expressed as a hyperbola is set as a function g:S=g(Q) which passes through a point (S1, Q1) obtained from the generated code quantity per unit time S1 and the average quantization scale per unit time Q1. Executing this coding program by a computer system or the like enables to obtain appropriate value by arithmetic operation reflecting a relation between generated code quantity and quantization scale.

BRIEF DESCRIPTION OF THE DRAWINGS

FIG. 10 is a block diagram illustrating a system configuration of a moving picture variable bit rate coding apparatus according to a fifth embodiment of the present invention.

FIG. 11 is a diagram for explaining a relation between bit rate and play-back picture quality in moving picture coding.

THE PREFERRED EMBODIMENTS OF THE INVENTION

Hereinafter a description is given of a moving picture coding apparatus according to the present invention in the case of using the two MPEG methods as coding methods, with reference to drawings.

Embodiment 1.

A moving picture variable bit rate coding apparatus according to a first embodiment of the present invention is used to perform coding processing by obtaining a complexity from a generated code quantity and then setting a quantization scale according to the obtained complexity.

Figure 1:
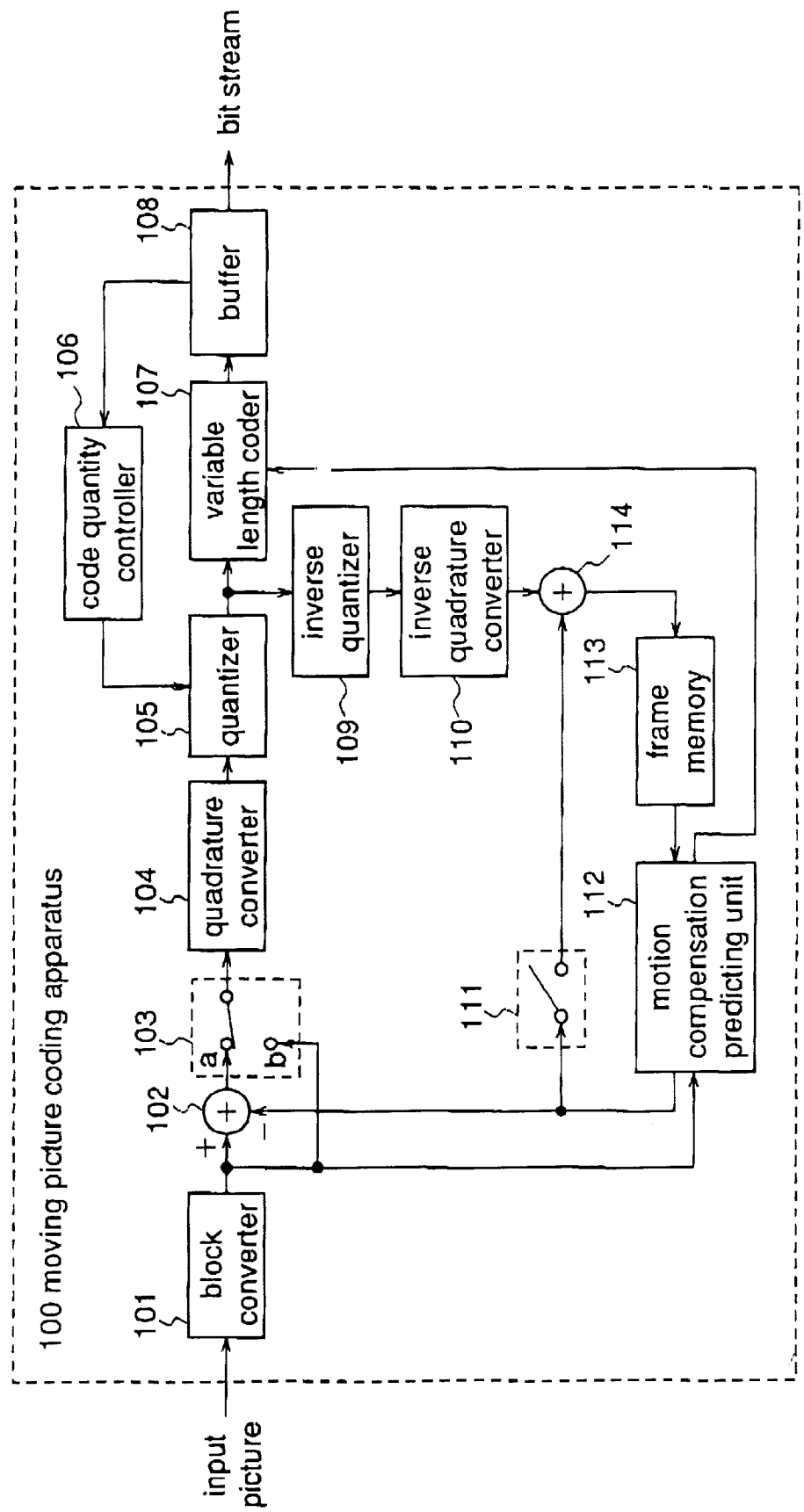
FIG. 1 is a block diagram illustrating a configuration of a moving picture variable bit rate coding apparatus according to a first embodiment of the present invention.

FIG. 1 is a block diagram illustrating a configuration of a moving picture coding apparatus according to the first embodiment. As shown in the figure, the moving picture coding apparatus 100 according to the first embodiment comprises: a block converter 101; a differentiator 102; switches 103 and 111; a quadrature covetor 104; a quantizer 105; a code quantity controller 106; a variable length coder 107; a buffer 108; an inverse quantizer 109; an inverse quadrature coveter 110; a motion compensation predictor 112; a frame memory 113; and an adder 114.

The block converter 101 performs blocking processing to an input picture input to the coding apparatus as digitized moving picture data for a coding processing which follows, working as a block conversion means for generating macroblocks as blocked data. The differentiator 102 obtains a difference between macroblock as blocked input picture data and a predictive picture which will be described. The switch 103 changes a processing object which is to be input to the quadrature coveter 104, corresponding to a coding mode. The quadrature converter 104 performs quadrature conversion such as discrete cosine transform (DCT) to input data, working as a picture conversion means for generating quadrature conversion coefficient. The quantizer 105 performs quantization to the quadrature conversion coefficient using a quantization scale output from the code quantity controller which will be described, working as a quantization means for generating quantized quadrature conversion coefficient.

The code quantity controller 106 works as a code quantity counting means for counting a quantity of code generated in each frame, an average quantization scale calculating means for obtaining an average quantization scale of each picture, and a quantization scale deciding means for obtaining a complexity of a frame using the code quantity counted and quantization scale of each frame, deciding a new quantization scale according to the complexity, and outputting the new quantization scale obtained to the quantizer.

The variable length coder 107 performs variable length coding to a quantized conversion coefficient, working as a code generating means for generating bit streams as outputs of the coding apparatus 100. The buffer 108 temporarily stores the bit streams output from the variable length coder 107. The inverse quantizer 109 performs inverse quantization processing to the quantized quadrature conversion coefficient, which is an inverse of the quantization processing performed by the quantizer 105, to generate decoded quadrature conversion coefficient. The inverse quadrature converter 110 performs inverse quadrature conversion to the decoded quadrature conversion coefficient, which is an inverse of the quadrature conversion performed by the quadrature converter 104, to generate a locally decoded picture. The switch 111 determines whether or not to output predictive picture to the adder 114, according to a coding machine. The motion compensation predicting unit 112 performs motion prediction to data input to obtain motion vectors. The frame memory 113 stores picture data which is used as reference picture. The adder 114 performs an addition between a locally decoded picture and the predictive picture.

In the coding of moving pictures according to MPEG2 or the like, compression coding is performed to digital picture data consisting of a series of still pictures (frame picture), which is digitized moving picture. This processing has several types: an intra-frame coding for compressing still pictures of one frame (corresponding to one picture) based on their spatial correlation (correlation within one frame) with no redundancy; and an inter-frame coding for compressing still pictures of frames which are close in temporal order, i.e., contiguous frames, based on their temporal correlation (correlation between frames) with no redundancy.

In general, intra-frame coding is performed, but a combination of intra-frame coding and inter-frame coding provides coded data compressed in high compression rate. In inter-frame coding, enhancement of compression rate is implemented by obtaining a difference between a predictive picture and a picture as a coding object and then coding this difference. To generate this predictive picture, prediction is performed by one of three prediction methods: forward prediction in which prediction is performed based on data immediately before target data; backward prediction in which prediction is performed based on data immediately after target data; and bidirectional prediction in which both forward prediction and backward prediction are performed. Generally, intra-frame coding is represented as "I", forward prediction coding as "P", and bidirectional prediction coding (including backward prediction) as "B".

Figure 2:
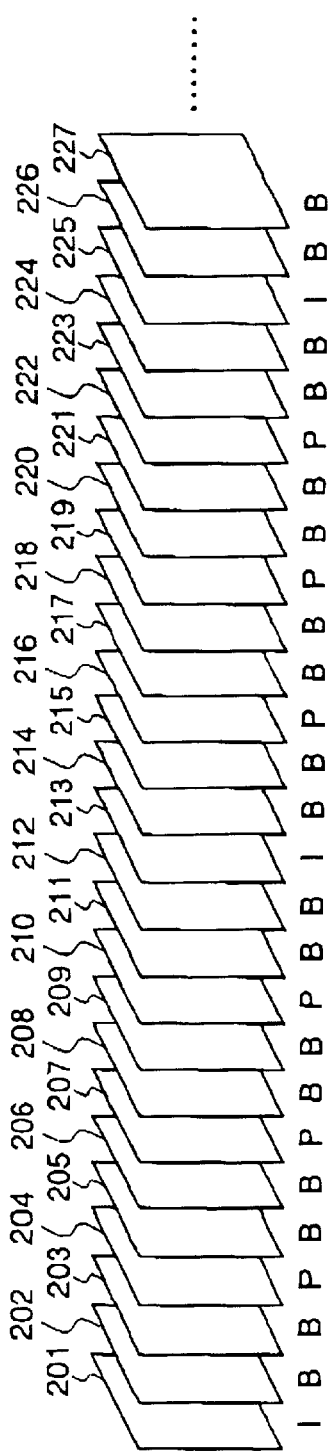
FIGS. 2(a) to 2(c) are diagrams for explaining frames, macroblocks, and blocks as constituents of a moving picture input to a moving picture variable bit rate coding apparatus according to the present invention.
Figure 2:
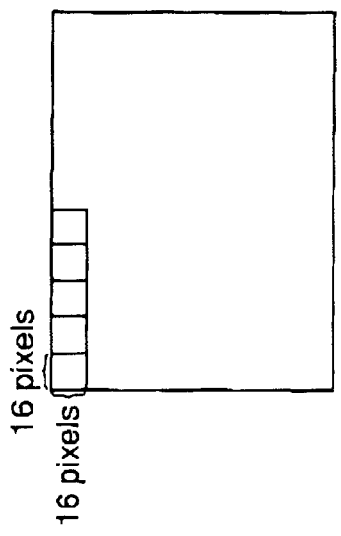
Figure 2:
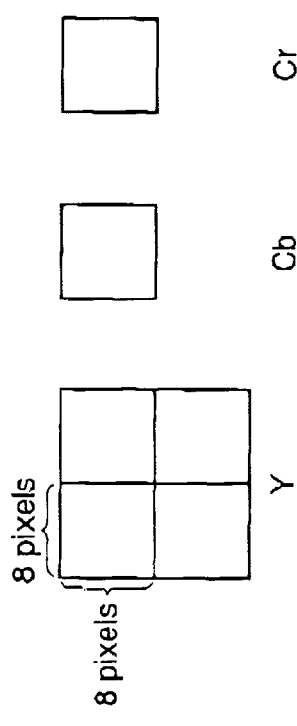

FIGS. 2(a) to 2(b) are diagrams for explaining coding modes in the first embodiment. Assume that a moving picture input to the moving picture coding apparatus of the first embodiment comprises frames 201 to 227..., as shown in FIG. 2(a) which illustrates that the frames 201 to 227 are sequentially located in temporal order with frame 201 as a first one. This figure also illustrates that the codes attached to the respective frames 201 to 227, "I", "P", and "B" indicate that each frame is set to be one of I picture (intra-frame coded picture), P picture (inter-frame forward predictive-coded picture), and B picture (inter-frame bidirectional predictive-coded picture). Based on this setting, the coding apparatus of the first embodiment decides a coding mode from among intra-frame coding, inter-frame forward predictive coding, and inter-frame bidirectional predictive coding, and then performs coding.

Hereinafter a description is given of a schematic operation of the coding apparatus of the first embodiment in the respective coding modes: (A) intra-frame coding, (B) inter-frame forward predictive coding, and (C) inter-frame bidirectional predictive coding.

(A) intra-frame coding

Initially, a description is given of a basic operation of the moving picture coding apparatus for an input frame as an I picture. In the first embodiment, switching by the switches is not described, but in this case, in the moving picture variable bit rate coding apparatus of the first embodiment shown in FIG. 1, the switch 103 is closed to position b, and the switch 111 does not establish connection.

First of all, an input picture as I picture is input to the moving picture coding apparatus. The frame picture input is divided into macroblocks of 16×16 pixels by the block converter 101, as shown in FIG. 2(b). Since the switch 103 is closed to position b, macroblocks are directly input to the quadrature converter 104 without passing through the adder 102. The quadrature converter 104 subdivides one macroblock into blocks of 8×8 pixels as shown in FIG. 2(c) and subjects each block to quadrature conversion so as to obtain a quadrature conversion coefficient.

Next, the quadrature conversion coefficient is output from the quadrature converter 104 to the quantizer 105 where the coefficient is subjected to quantization processing. This quantization processing is performed by dividing the quadrature conversion coefficient with a quantization scale given from the code quantity controller 106 and an 8 by 8 quantization matrix corresponding to each frequency component. The quantized quadrature conversion coefficient obtained by the quantization processing is input to the variable length coder 107 where the quantized coefficient is converted to a bit stream and input to the buffer 108. The bit stream input to the buffer 108 is read at a given rate in burst mode or continually, and the read data is stored in a storage medium as the result of the coding output from the moving picture coding apparatus 100.

On the other hand, the quantized quadrature conversion coefficient is output from the quantizer 105 to the inverse quantizer 109 where the quantized coefficient is subjected to inverse quantization which is an inverse of the quantization processing and output to the inverse quadrature converter 110. Then, in the inverse quadrature converter 110, this coefficient is subjected to inverse quadrature conversion which is an inverse of the quadrature conversion processing to become locally decoded picture. Since the switch 111 does not establish connection, the locally decoded picture is directly stored into the frame memory 113.

(B) Inter-frame forward predictive coding

Next, a description is given of a basic operation of the moving image coding apparatus for an input frame as P picture. When inter-frame coding is performed, in the moving picture variable bit rate coding apparatus of the first embodiment shown in FIG. 1, the switch 103 is closed to position a and the switch 111 also establishes connection.

A frame picture input to the moving picture coding apparatus is divided into macroblocks of 16×16 pixels by the block converter 101, as in the case of processing I picture. The macroblocks are input to the motion compensation predicting unit 112 where motion prediction is performed with the locally decoded picture stored in the frame memory 113 as a reference picture. When the forward predictive coding is performed, one of an I picture frame and a P picture frame is used as a reference picture. For example, when a frame picture as a coding object is frame 204 (P picture) shown in FIG. 2(a), the locally decoded picture of frame 201 (I picture) stored in the frame memory 113 is used as a reference frame, and with frame 207 (P picture) as a coding object, motion prediction is performed using frame 204 (P picture) as a reference frame. The motion vector of a frame picture which is a coding object obtained by motion prediction is also output to the variable length coder 107, where it is subjected to variable length coding and then added to the output of the moving picture coding apparatus. In addition, the motion compensation predicting unit 112 generated a predictive picture and outputs it to the differentiator 102 and the switch 111.

On the other hand, the macroblock of the input frame picture is input to the differentiator 102 to obtain a difference between this macroblock and a macroblock of a compensation reference picture. The differentiator 102 outputs the difference to the quadrature converter 104 as a differential macroblock.

Since the switch 103 is closed to position a, differential blocks are input from the differentiator 102 to the quadrature converter 104. Each differential macroblock is converted into a bit stream by means of the quadrature converter 104, the quantizer 105, and the variable length coder 107, and input to the buffer 108, as in the case of processing I picture. Further, as in the case of the coding mode described in the item (A), the input bit stream is read and treated as the device output of the moving picture coding apparatus 100.

In addition, the quantized quadrature conversion coefficient of the differential macroblock is input to the inverse quantizer 109 and subjected to inverse quantization. Then, this coefficient is subjected to inverse quadrature conversion by the inverse quadrature converter 110, and a resultant locally decoded picture is output to the adder 114. When an input frame is a P picture, a switch 111 establishes connection and thus a predictive picture output from the motion compensation predicting unit 112 is input to the adder 114. Therefore, an addition between the locally decoded picture and the predictive picture is performed by the adder 114, and another locally decoded picture obtained as the result of the addition is stored in the frame memory 113.

(C) Inter-frame bidirectional predictive coding

Since inter-frame coding is performed, the switches 103 and 110 operate in the same manner as in the coding mode "B": the switch 103 is closed to position a and the switch 111 establishes connection.

This means that the operation in this coding mode is equal to the operation for the coding mode of the item (B), inter-frame forward predictive coding, except the operation of motion prediction by the motion compensation predicting unit 112 and that of storing locally decoded picture into the frame memory 113.

When an input picture is a B picture, the motion compensation predicting unit 112 performs motion prediction to a macroblock of an input frame picture as a coding object, referring to frame pictures immediately before a target frame picture on the assumption that a reference frame is either a P picture or an I picture. For example, when frame 206 (B picture) shown in FIG. 2(a) is a frame as a coding object, the motion compensation predicting unit 112 performs motion prediction using locally decoded pictures of frame 204 (P picture) and frame 207 (P picture) as reference frames.

Further, as described in the items (B) "inter-frame forward predictive coding" and (C) "inter-frame bidirectional predictive coding", frame pictures as I pictures or P pictures only are used as reference frames and frame pictures as B pictures are not treated as reference frames. Therefore, when the input frame is a B picture, it is not necessary to generate locally decoded picture, and thus the content of the frame memory 113 is not changed.

The operations other than the described ones are identical to the operations described in the item (B) "inter-frame forward predictive coding", and thus will not be described.

By the above-described operations, an input moving picture is processed an bit streams are output as the result of the coding. On the other hand, the code quantity controller 106 counts a quantity of code input to the buffer 108, and using the counted code quantity and quantization scale of each frame, a complexity of a frame is obtained. From the complexity, a new quantization scale is determined and transmitted to the quantizer 105. Hereinafter the configuration and operation of this code quantity controller 106 will be described.

Figure 3:
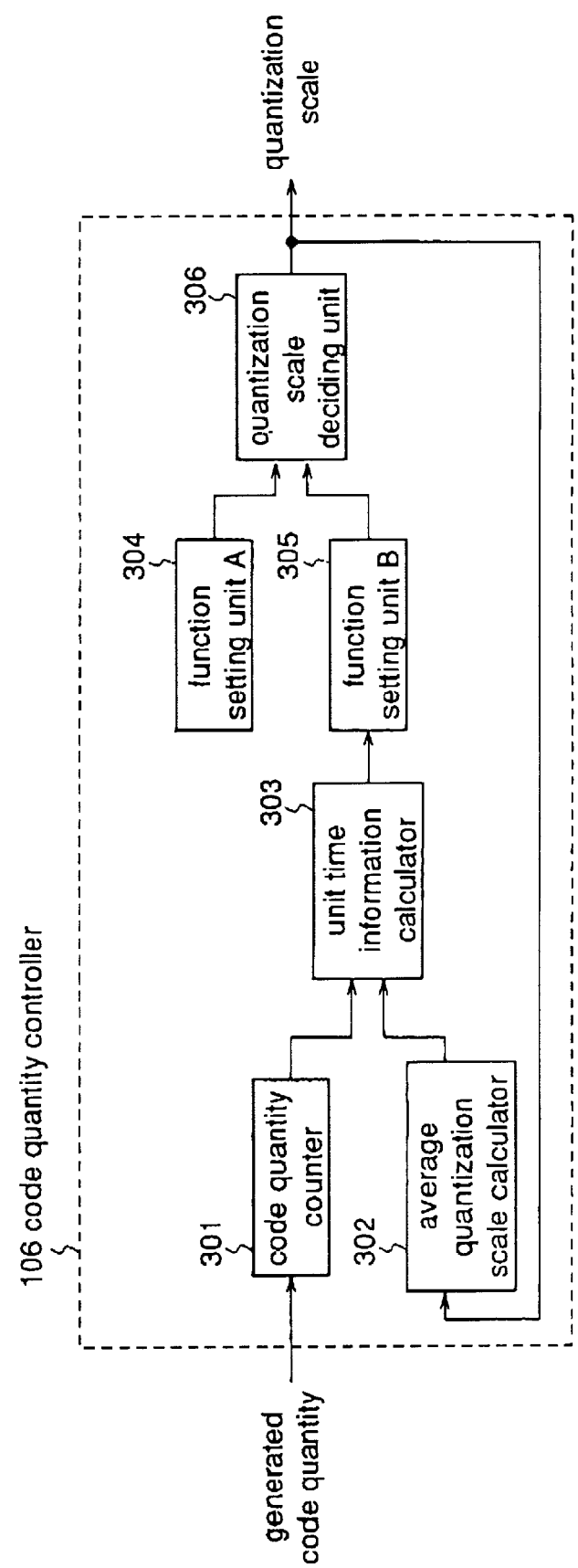
FIG. 3 is a block diagram illustrating a configuration of a code quantity controller according to the first embodiment.

FIG. 3 is a block diagram illustrating the configuration of the code quantity controller 106. As shown in the figure, the code quantity controller 106 comprises a code quantity counter 301, an average quantization scale calculator 302, a unit time information calculator 303, a function setting unit A 304 as a first function setting unit, a function setting unit B 305 as a second function setting unit, and a quantization scale deciding unit 306.

The code quantity counter 301 counts a quantity of generated code in each picture based on a bit stream output from the variable length coder 107 and temporarily stored in the buffer 108. The average quantization scale calculator 302 obtains an average quantization scale of each frame. The unit time information calculator 303 obtains a generated code quantity, a complexity, and a quantization scale each in one GOP unit using a generated code quantity and average quantization scale of each frame. The function setting units A304 and B305 set functions for arithmetic operations for control, respectively. The quantization scale deciding unit 306 obtains a quantization scale to be used by the quantizer 105, using the set functions.

Next, the operation of the code quantity controller 106 for coding moving picture shown in FIG. 2(a) will be described in detail.

The coding processing to a frame picture as a constituent of a moving picture shown in FIG. 2(a) is performed in the following order, assuming that a first frame is initially coded whether the frame is an I picture, a P picture, or a B picture, and that frames immediately before a frame as a coding object are necessarily coded in the case of frame coding with bidirectional prediction. The order of the frames is, from top to end, frame 201 (I picture), frame 204 (P picture), frame 202 (B picture), frame 203 (B picture), frame 207 (P picture), frame 205 (B picture), and frame 206 (B picture). According to the order, the respective frames are input to the moving picture coding apparatus. Since each first one of I picture frames, P picture frames, and B picture frames are coded using a fixedly set quantization scale, the quantization scale deciding unit 306 outputs to the quantizer 105 the set quantization scales corresponding to frame 201 (I picture), frame 204 (P picture), and frame 202 (B picture). In this case, it is assumed that every macroblock of a frame as a coding object is quantized using a set quantization scale thereof.

In the moving picture coding apparatus of the first embodiment, frames 201, 204, and 202 are coded and the resultant bit streams are input to the buffer 108 by the above-described operations. During these operations, the code quantity counter 301 obtains generated code quantities from the buffer 108 to count a generated code quantity in each frame. On the other hand, the average quantization scale calculator 302 obtains an average quantization scale of each frame using a quantization scale output corresponding to each frame. Here assume that the respective generated code quantities of I, P, and B pictures are represented as Si, Sp, and Sb, and the respective average quantization scales represented as Qi, Qp, and Qb. Therefore, when coding of frames 201, 204, 202 is completed, the respective generated code quantities are Si, Sp, and Sb, and the respective average quantization scales are Qi, Qp, and Qb.

Figure 4:
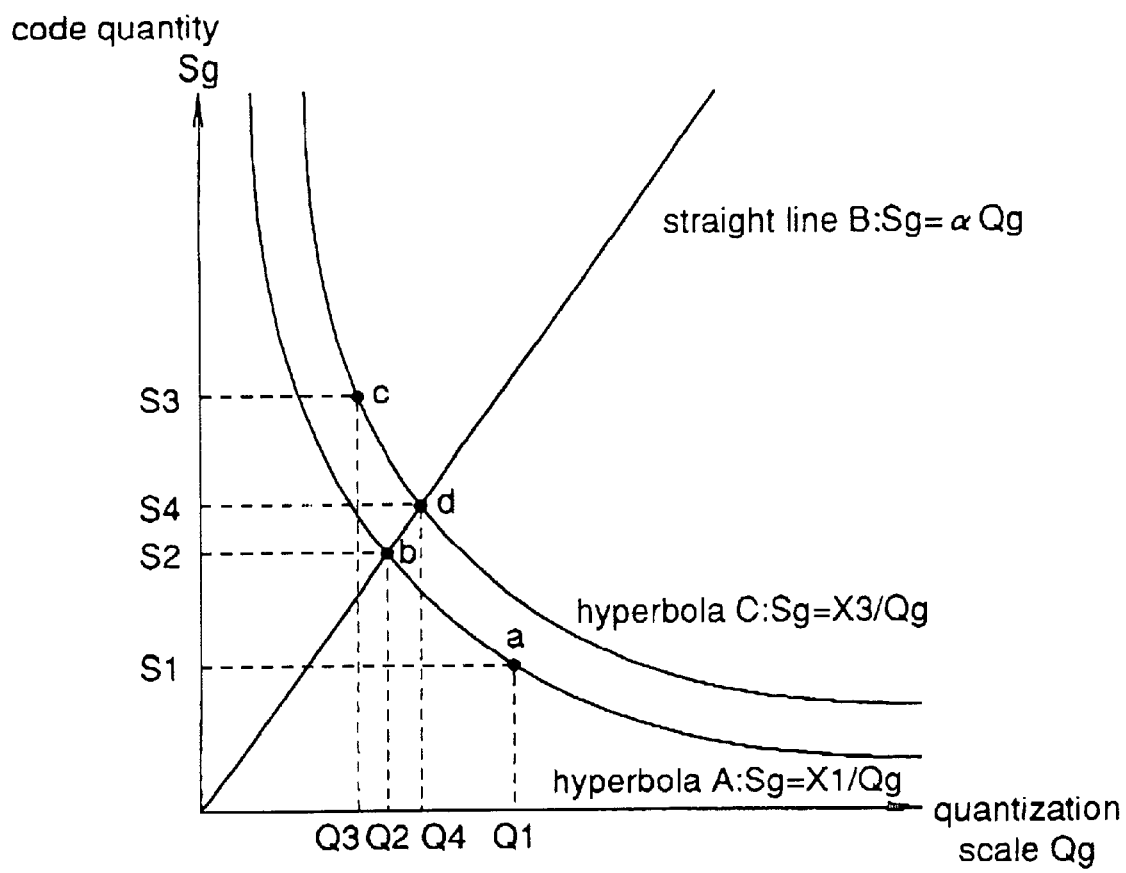
FIG. 4 is a diagram for explaining a function set by a function setting unit included in the coding apparatus according to the first embodiment.

Following frames 201, 204, and 202, frame 203 is coded, and in this coding, the quantization scale of frame 203 has to be output from the quantization scale deciding unit 306 before the coding processing. FIG. 4 is a diagram for explaining a function setting in the first embodiment. Hereinafter a description is given of the operation of the code quantity controller 106 of the first embodiment for setting quantization scale.

Initially, using the outputs of the code quantity counter 301, Si, Sp, and Sb, and the outputs of the average quantization scale calculator 302, Qi, Qp, and Qb, a generated code quantity in one GOP unit Sg, a complexity in one GOP unit Xg, and a quantization scale in one GOP unit Qg, are obtained by formulas 1 to 3.

[Formula 1]

$$Sg = Si + Np \times Sp + Nb \times Sb$$

[Formula 2]

$$Xg = Si \times Qi + Np \times Sp \times Qp + Nb \times Sb \times Qb$$

$$Qg = \frac{Xg}{Sg} \quad \text{[Formula 3]}$$

In formula 1, Np and Nb are a number of P pictures and that of B pictures included in one GOP, respectively. In MPEG2, groups are formed in such a way that each group includes at least one I picture. For example, in the case of the moving picture shown in FIG. 2(a), frames 201 and 212 including frame 201 as an I picture are treated as one group, and therefore Np is 3 and Nb is 8. Hereinafter a description is given on the assumption that Sg, Xg, and Qg are S1, X1, and Q1, respectively.

The function setting unit B 305 sets, as a function g, a hyperbola A shown in FIG. 4 which passes through a point a (Q1, S1) on a graph with an abscissa Qg and an ordinate Sg, using a quantization scale in one GOP unit Q1 and a generated code quantity in one GOP unit S1 both output from the unit time information calculator 303. In the function setting unit A 304, function setting has been performed before the coding, and a straight line B is set as a function f. The slope α of this line B is an integer constant depending on the value of a target bit rate; the higher the target bit rate, the larger the slope α, whereas the lower the target bit rate, the smaller the slope α.

Next, the quantization scale deciding unit 306 obtains an intersection b of the hyperbolas A and B, (A2, S2). Q2 can be obtained by formula 4:

$$Q2 = \sqrt{\frac{Q1 \times S1}{\alpha}} \quad \text{[Formula 4]}$$

The quantization scale deciding unit 306 outputs this Q2 to the quantizer 105 as a quantization scale used for the coding to frame 203.

While frame 203 is being coded, the code quantity counter 301 counts a generated code quantity in frame 203, and the average quantization scale calculator 302 obtains an average quantization scale of this frame. Frame 203 is a B picture, and when the coding of this frame is completed, its generated code quantity and average quantization scale are Sb and Qb, respectively.

Following frame 203, frame 206 is coded, and in this coding, a quantization scale of frame 206 has to be output from the quantization scale deciding unit 306 before the coding processing is performed. Initially, using the outputs of the code quantity counter 301, Si, Sp, and Sb, and the outputs of the average quantization scale calculator 302, Qi, Qp, and Qb, a generated code quantity in one GOP unit Sg, a complexity in one GOP unit Xg, and a quantization scale in one GOP unit Qg are obtained again by formulas 1 to 3. Here it is assumed that Sg, Xg, and Qg are S3, X3, and Q3, respectively.

The function setting unit B 305 sets, as a function g, a hyperbola C shown in FIG. 4 which passes through a point c (Q3, S3), using a quantization scale in one GOP unit Q3 and a generated code quantity in one GOP unit S3 as the outputs from the unit time information calculator 303. Then, the quantization scale deciding unit 306 obtains an intersection d (Q4, S4) of the hyperbola C and the straight line B set by the function setting unit A 304. Q4 can be obtained by formula 5:

$$Q4 = \sqrt{\frac{Q3 \times S3}{\alpha}} \quad \text{[Formula 5]}$$

The quantization scale deciding unit 306 outputs this Q4 to the quantizer 105 as a quantization scale used for the coding to frame 206.

While frame 206 is being coded, the code quantity counter 301 counts a generated code quantity in frame 206, and the average quantization scale calculator 302 obtains an average quantization scale of this frame. Frame 206 is a B picture, and when the coding of this frame is completed, its generated code quantity and average quantization scale are Sb and Qb, respectively.

By repeating the above-described operations, a quantization scale is determined corresponding to a generated code quantity, and the coding processing is continued using the determined quantization scale. More specifically, frame M is coded in the following procedure: the code quantity counter 301 counts the respective intra-frame generated code quantities of an I picture, a P picture, and a B picture immediately before frame M, and these values are represented as Si, Sp, and Sb; the average quantization scale calculator 302 calculates the average values of the inter-frame quantization scales of such pictures, and these values are represented as Qi, Qp, and Qb, respectively; the unit time information calculator 303 obtains Sg, Zg, and Qg from these values of Si, Sp, Sb, Qi, Qp, and Qb, using formulas 1 to 3; and the quantization scale deciding unit 306 obtains intersections to output the value of the Qg of each intersection to the quantizer 105 as the quantization scale of frame M, which intersections are those of a prescribed straight line B set by the function setting unit A 304 and hyperbolas A and C each being set by the function setting unit B 305 and passing through a point (Qg, Sg).

Figure 5:
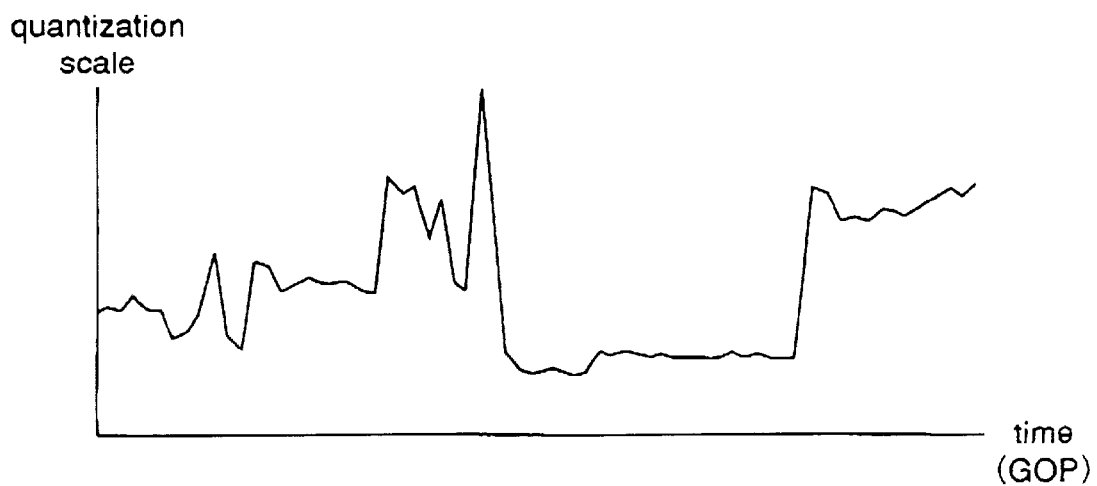
FIGS. 5(a) and 5(b) are diagrams illustrating examples of time shifting in quantization scale and in generated code quantity in a coding processing according to the first embodiment.
Figure 5:
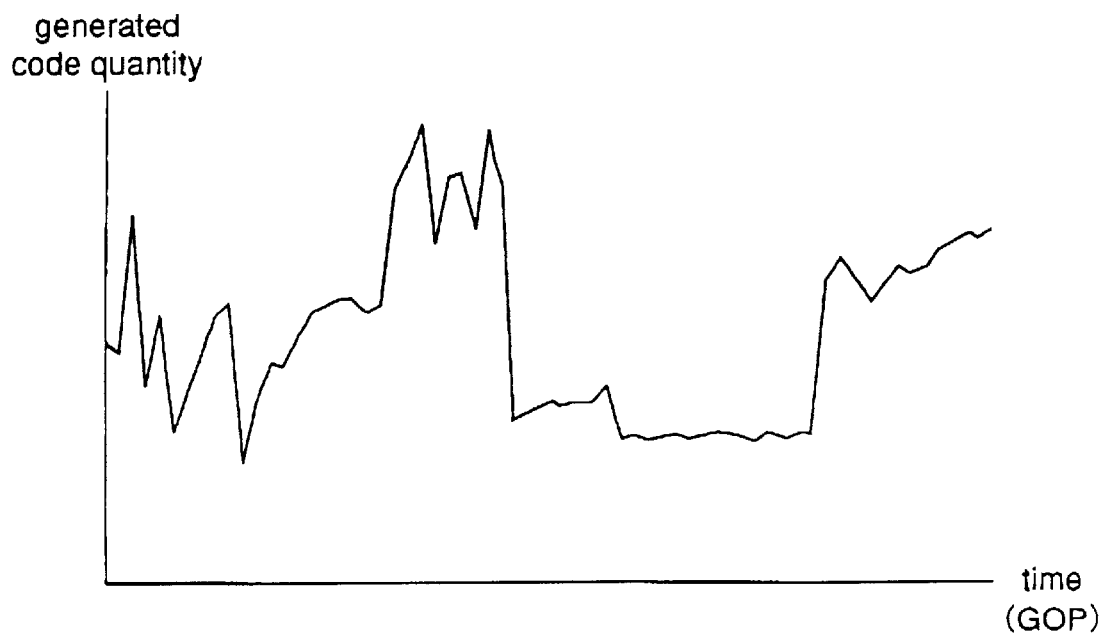

FIGS. 5(a) and 5(b) are diagrams illustrating examples of a time shifting of a quantization scale in one GOP unit Qg and a generated code quantity in one GOP unit Sg. As shown in the figures, in the moving picture coding apparatus of the first embodiment, coding is performed in such a way that quantization scale Qg is approximately proportional to a generated code quantity Sg.

Thus, according to the first embodiment, the moving picture coding apparatus includes a code quantity controller 106 which comprises a code quantity counter 301, an average quantization scale calculator 302, a unit time information calculator 303, a function setting unit A 304 as a first function setting unit, a function setting unit B 305 as a second function setting unit, and a quantization scale deciding unit 306, and performs control by setting a quantization scale corresponding to a code quantity using a function F:S=F(Q), such that a relation between an average quantization scale in one GOP unit Qg an da generated code quantity in one GOP unit Sg always satisfies the function f. The use of a quantization scale set by the above-described method enables to allocate a larger quantity of code to a frame having a larger amount of information and to code a frame having a small amount of information using a smaller quantity of code, whereby it is possible to improve a picture quality of coded data without degrading coding efficiency in contrast with the conventional fixed bit rat coding in which a certain quantity of codes are allocated regardless of a property of a moving picture, and to perform a real time processing in response to an input of a moving picture which is impossible in the conventional variable bit rate coding. Therefore, it is possible to obtain high picture-quality coded data with ease in a short period of time by performing a real time processing in response to capturing of a moving picture, even in the case of using inexpensive, consumer AV appliances and consumer type computer systems.

Although in the first embodiment the description is given on the assumption that a moving picture in a picture format shown in FIGS. 2(a) to 2(c)is an object of coding object is not limited to this format, and a moving picture in any other format can be subjected to the variable bit rate coding in real time processing.
Embodiment 2.

A moving picture variable bit rate coding apparatus according to a second embodiment of the present invention sets a quantization scale according to a generated code quantity like the apparatus of the first embodiment, but in this control, the apparatus utilizes a different function from that used in the first embodiment.

Figure 6:
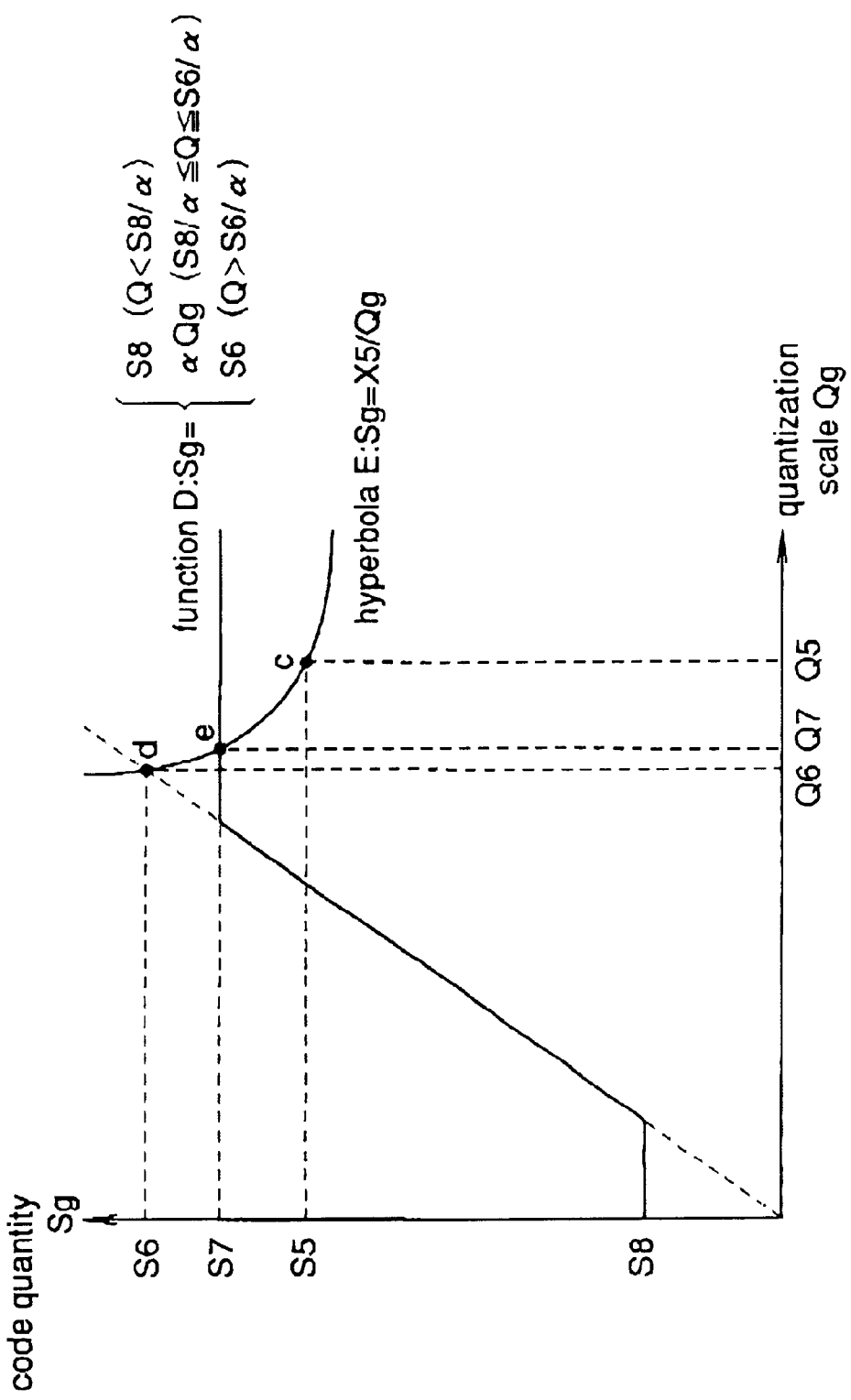
FIG. 6 is a diagram for explaining a function set by a function setting unit included in a coding apparatus according to a second embodiment of the present invention.

The moving picture coding apparatus of the second embodiment differs from that of the first embodiment in the functions of the function setting unit A 304 and the quantization scale deciding unit 306, but the whole configuration of this apparatus and the configuration of a code quantity controller 106 thereof are equal to those in the first embodiment and thus FIGS. 1 and 3 are used for explaining this apparatus. The schematic operations for coding by the moving picture coding apparatus of the second embodiment are also identical to those for the coding apparatus of the first embodiment described in the items A to C, and the description will be omitted. FIG. 6 is a diagram for explaining a setting of functions in the second embodiment. Here a description is given of the operation of the code quantity controller 106 in the moving picture coding processing by the moving picture coding apparatus according to the second embodiment of the present invention, with reference to FIG. 6.

In the first embodiment, a function setting unit A 304 sets a straight line B as a function f as shown in FIG. 4, but in the second embodiment, a function D is used as a function f as shown in FIG. 6. The straight line B used in the first embodiment is represented as a dashed line in this figure. The values of the generated code quantity S7 and S8 on the function D correspond to a minimum target bit rate and a maximum target bit rate, respectively. More specifically, in the function D in the second embodiment, when a code quantity Sg takes a value ranging from S7 to S8, a relation between a code quantity Sg and a quantization scale Qg is represented linear as in the first embodiment, and outside the range, Sg takes a constant value S7 or S8.

Assume that in deciding a quantization scale of frame M to be coded, a generated code quantity in one GOP unit Sg, a complexity in one GOP unit Xg, a quantization scale in one GOP unit Qg, which are all obtained by the unit time information calculator 303, are S5, X5, Q5, respectively. The function setting unit B 305 sets, as a function g, a hyperbola E passing through a point c (Q5, S5) on a graph with Qg as an abscissa and Sg as an ordinate shown in FIG. 6, using a quantization scale in one GOP unit Q5 and a generated code quantity in one GOP unit S5 which are both output from the unit time information calculator 303. The function setting unit A 304 has performed function setting before the coding, and the above-described function D is set as a function f. The quantization scale deciding unit 306 obtains an intersection of the hyperbola E and the function D. Although in the first embodiment an intersection d of a hyperbola E and a straight line (Q6, S6) is obtained according to the setting, in the second embodiment, an intersection e of these lines (Q7, S7) is obtained. The quantization scale deciding unit 306 outputs this Q7 to the quantizer 105 as a quantization scale used for coding frame M.

More specifically, frame M is coded in the following procedure: the code quantity counter 301 counts the respective quantities of the intra-frame generated codes of I picture, P picture, and B picture immediately before a target frame and indicates them as Si, Sp, and Sb, respectively; the average quantization scale calculator 302 obtains the average values of the respective intra-frame quantization scales of these picture frames by arithmetic operations and indicate them as Qi, Qp, and Qb, respectively; The unit time information calculator 303 obtains Sg, Xg, and Qg from the respective values of Si, Sp, Sb, Qi, Qp, and Qb, using formulas 1 to 3; and the quantization scale deciding unit 306 obtains an intersection of a prescribed function D set by the function setting unit A 304 and a hyperbola E passing through a point (Qg, Sg) and being set by the function setting unit B 305, outputting the value of the Qg of the intersection to the quantizer 105 as a quantization scale.

As described above, the moving picture coding apparatus according to the second embodiment includes a code quantity controller 106 which comprises a code quantity counter 301, an average quantization scale calculator 302, a unit time information calculator 303, a function setting unit A 304 as a first function setting unit, a function setting unit B 305 as a second function setting unit, and a quantization scale deciding unit 306, and this coding apparatus performs control by setting a quantization scale corresponding to a code quantity using a function f:S=F(Q) as shown in FIG. 6, in such a way that a relation between an average quantization scale in one GOP unit Qg and a generated code quantity in one GOP unit Sg always satisfies the function f. Therefore, this enables not only to allocate an appropriate code quantity corresponding to the amount of information included in a frame of an input picture in a real time processing, as in the first embodiment, but to ensure a minimum bit rate and a maximum bit rate by using a function D shown in FIG. 6.

Embodiment 3.

A moving picture variable bit rate coding apparatus according to a third embodiment of the present invention, sets a quantization scale corresponding to a generated code quantity, like the coding apparatus of the first embodiment, and for this control, the apparatus uses a different function from that used in the first embodiment.

Figure 7:
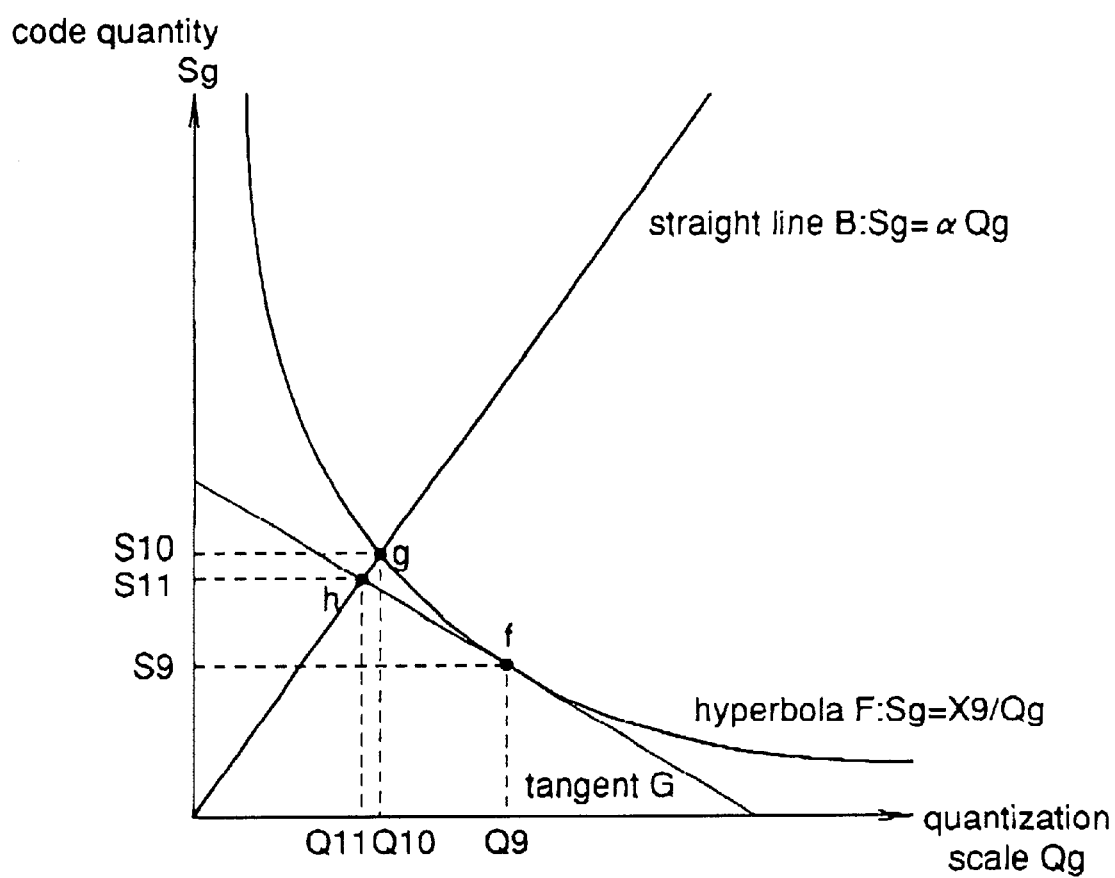
FIG. 7 is a diagram for explaining a function set by a function setting unit included in a coding apparatus according to a third embodiment of the present invention.

The moving picture coding apparatus of the third embodiment differs from that of the first embodiment in the functions of the function setting unit B 305 and the quantization scale deciding unit 306 both included in the code quantity controller 106 (see FIG. 1), but the whole configuration of this apparatus and the configuration of the code quantity controller 106 are identical to those in the first embodiment and thus FIGS. 1 and 3 are used for explaining them. The schematic operations for coding by the moving picture coding apparatus of the third embodiment are also identical to those of the first embodiment described in the items A to C, and thus the explanation will be omitted. FIG. 7 is a diagram for explaining a setting of functions in the third embodiment. Here a description is given of the operation of the code quantity controller 106 in the moving picture coding processing by the moving picture coding apparatus according to the third embodiment of the present invention, with reference to FIG. 7.

Although in the first embodiment a function setting unit A 304 sets hyperbolas A and C shown in FIG. 4 as a function g, in the third embodiment, a tangent G which is tangent to a hyperbola F shown in FIG. 7 is used as a function g.

Assume that the deciding a quantization scale of frame M to be coded, a generated code quantity in one GOP unit Sg, a complexity in one GOP unit Xg, a quantization scale in one GOP unit Qg, which are all obtained by the unit time information calculator 303, are S9, X9, Q9, respectively. The function setting unit B 305 sets, as a function g, a hyperbola F passing through a point f (Q9, S9) on a graph with Qg as an abscissa and Sg as an ordinate shown in FIG. 7, using a quantization scale in one GOP unit Q9 and a generated code quantity in one GOP unit S9 as the outputs of the unit time information calculator 303. In addition, the setting unit B 305 sets a tangent G which is tangent to the hyperbola F at a point f (Q9, S9). The function setting unit A 304 has performed function setting before the coding, and a straight line B is set as a function f.

The quantization scale deciding unit 306 obtains an intersection of the tangent G and the straight line B. Although in the first embodiment, an intersection g of a hyperbola F and a straight line b (Q10, S10) is obtained according to the setting, in the third embodiment, an intersection h (Q11, S11) is obtained. The value Q11 of this intersection h can be obtained by formula 6:

[Formula 6]

$$Q11 = \frac{2 \times X11}{\alpha \times Q11 \times S11} \quad \text{[Formula 6]}$$

The quantization scale deciding unit 306 outputs this Q11 to the quantizer 105 as a quantization scale used for coding frame M.

More specifically, frame M is coded in the following procedure: the code quantity counter 301 counts the respective numbers of intra-frame generated code quantities of an I picture, an P picture, and a B picture immediately before frame M and represents them as Si, Sp, and Sb, respectively; the average quantization scale calculator 302 obtains the average values of the respective intra-frame quantization scales of these picture frames by arithmetic operations and represents them as Qi, Qp, and Qb, respectively; The unit time information calculator 303 obtains Sg, Xg, and Qg from the values of Si, Sp, Sb, Qi, Qp, and Qb, using formulas 1 to 3; and the quantization scale deciding unit 306 obtains an intersection of a prescribed line B set by the function setting unit A 304 and a tangent G being tangent to the hyperbola F at a point (Qg, Sg), which hyperbola F is set by the function setting unit B 305 and passes through the point (Qg, Sg), to output the value of the Qg of the intersection to the quantizer 105 as a quantization scale of frame M.

As described above, the moving picture coding apparatus according to the third embodiment includes a code quantity controller 106 which comprises a code quantity counter 301, an average quantization scale calculator 302, a unit time information calculator 303, a function setting unit A 304 as a first function setting unit, a function setting unit B 305 as a second function setting unit, and a quantization scale deciding unit 306, and this apparatus performs control by setting a quantization scale corresponding to a code quantity using a function f:S≈f(Q) as shown in FIG. 7 with less arithmetic amount, in such a way that a relation between an average quantization scale in one GOP unit Qg and a generated code quantity in one GOP unit Sg always satisfies the function f. Therefore, it is possible to allocate an appropriate code quantity corresponding to the amount of information included in a frame of an input picture in real time processing, with further less process burden.

Embodiment 4.

A moving picture variable bit rate coding apparatus according to a fourth embodiment of the present invention sets a quantization scale corresponding to a generated code quantity, as in the first embodiment, but its bit rate control method is different from that according to the first embodiment.

The whole configuration of the moving picture coding apparatus of the fourth embodiment is identical to that of the first embodiment except for the configuration of the code quantity controller 106, and FIG. 1 is used for explaining this apparatus. The schematic operations of the moving picture coding apparatus of the fourth embodiment for coding processing are identical to those of the first embodiment described in the items A to C, and thus the description will be omitted.

Figure 8:
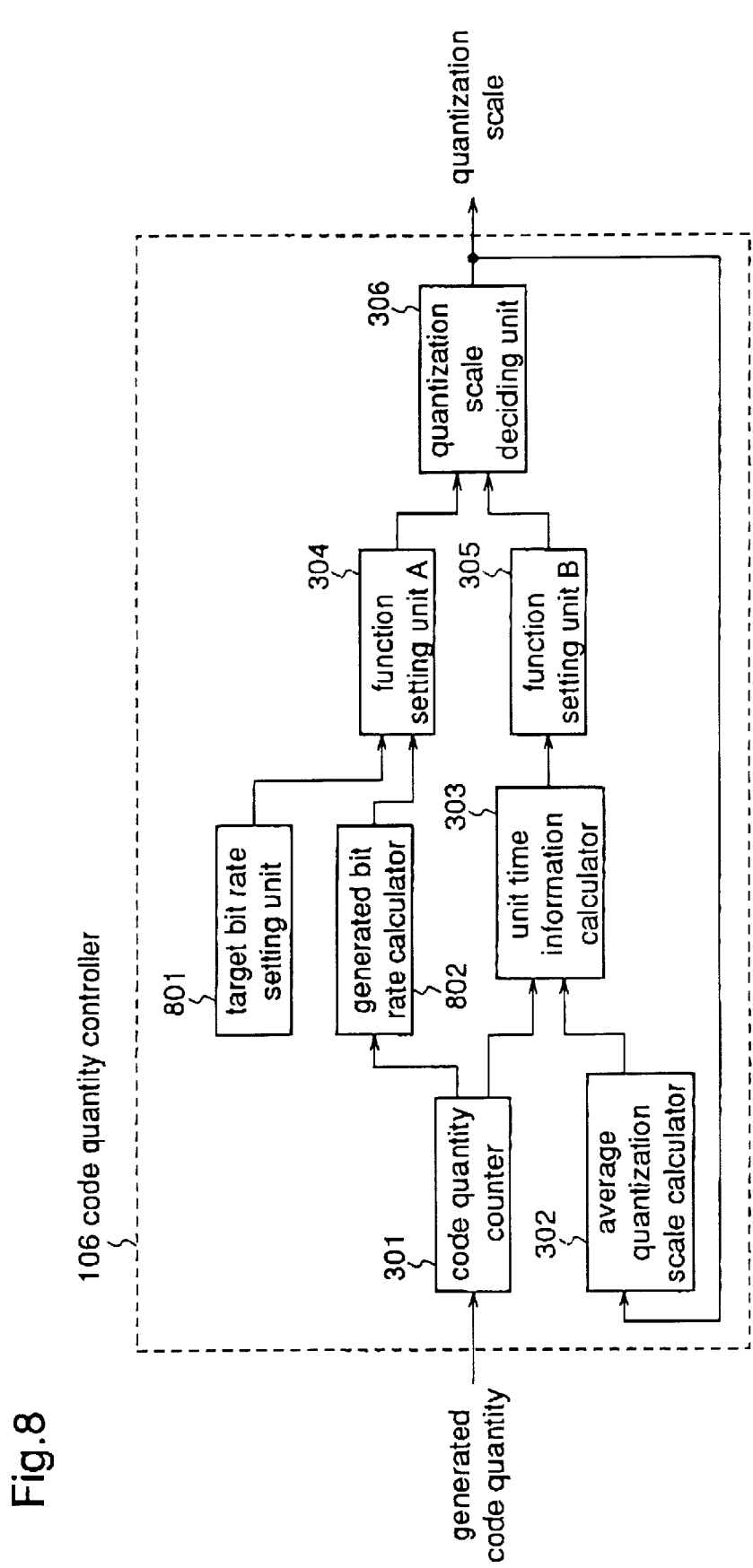
FIG. 8 is a block diagram illustrating a configuration of a code quantity controller included in a coding apparatus according to a fourth embodiment of the present invention.
Figure 9:
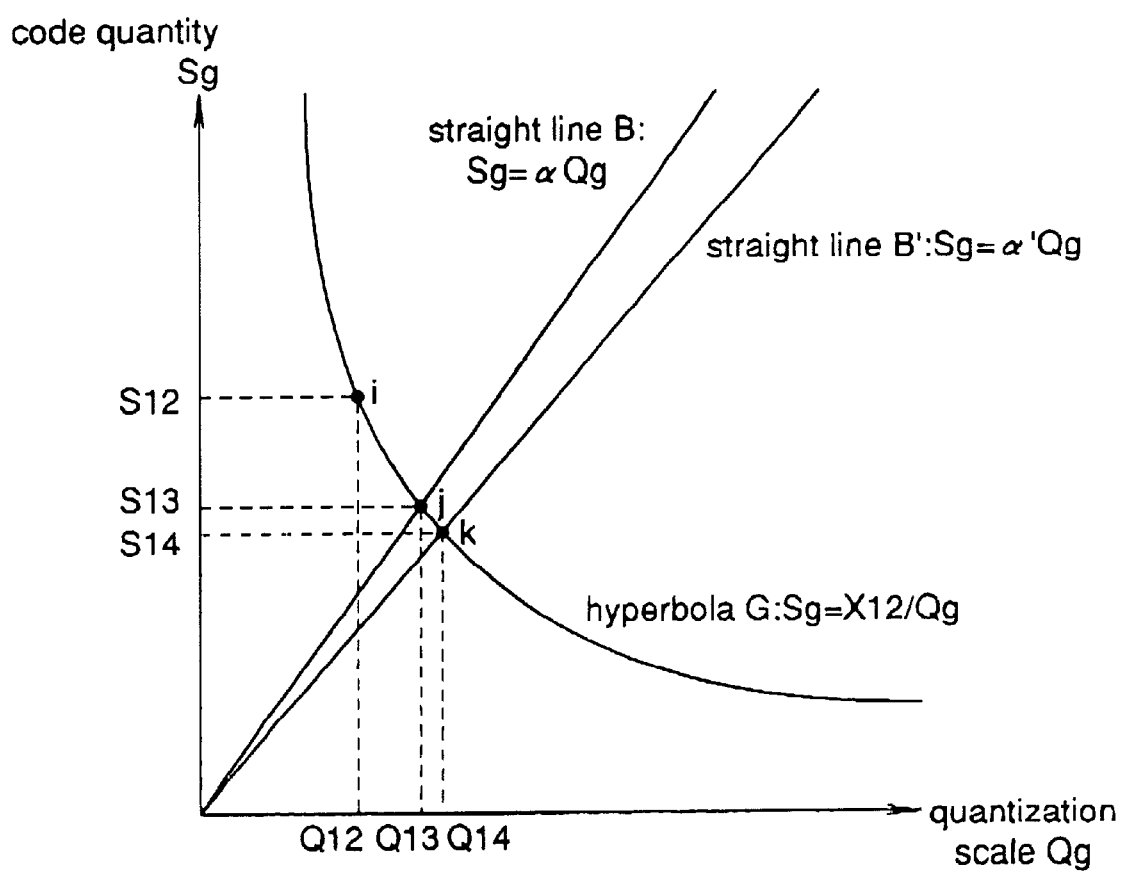
FIG. 9 is a diagram for explaining a function set by a function setting unit included in the coding apparatus of the fourth embodiment.

FIG. 8 is a diagram illustrating the configuration of the code quantity controller 106 included in the moving picture coding apparatus of the fourth embodiment, and FIG. 9 is a diagram for explaining a function setting according to the fourth embodiment. Hereinafter a description is given of the configuration and operation of the code quantity controller 106, with reference to FIGS. 8 and 9.

As shown in FIG. 8, the code quantity controller 106 of the fourth embodiment comprises a code quantity counter 301, an average quantization scale calculator 302, a unit time information calculator 303, a function setting unit A 304 as a first function setting unit, a function setting unit B 305 as a second function setting unit, and a quantization scale deciding unit 306, and further includes a target bit rate setting unit 801 and a generated bit rate calculator 802. More specifically, this apparatus has the configuration of the code quantity controller included in the motion picture coding apparatus according to any of the first to third embodiments to which the target bit rate setting unit 801 and the generated bit rate calculator 802 are added.

The target bit rate setting unit 801 is used to set a target bit rate in advance before coding an input frame is initiated, and the generated bit rate calculator 802 is used to calculate a real bit rate from each intra-frame generated code quantity counted by the code quantity counter 301.

As shown in FIG. 9, in the fourth embodiment, a straight line B is used as a function, as in the first embodiment. In the first embodiment, the slope α of the straight line B is an integer constant depending on a height of a target bit rate, whereas the slope α of the straight line B in the fourth embodiment is changed corresponding to a difference between a target bit rate and a generated bit rate as a real bit rate which are both obtained at established time intervals.

Hereinafter a description is given of the operation before the coding of frame 225 by the moving picture coding apparatus of the fourth embodiment when an input picture shown in FIG. 2(a) is coded.

In the function setting unit A 304, a straight line B having a slope α is set as a function f. In the fourth embodiment, when the same coding processing as that in the first embodiment is performed, the change of the slope α of the straight line B is performed immediately before the coding of I picture, that is, in one GOP unit.

Assume that at when coding of frame 221 shown in FIG. 2(a) is completed, the respective generated code quantities of I picture, P picture, and B picture immediately before the target frame, which are all counted by the code quantity counter 301, are Si, Sp, and Sb, and the respective average quantization scales of these pictures, which are all calculated by the average quantization scale calculator 302, are Qi, Qp, and Qb. A generated code quantity in one GOP unit Sg, a complexity in one GOP unit Xg, and a quantization scale in one GOP unit Qg, which are all obtained by the unit time information calculator 303 from the above values using formula 1 to 3, are S12, X12, and Q12. Further, decision of quantization scale in the processing to frame 221 is performed using a straight line B shown in FIG. 9.

On the other hand, the target bit rate setting unit 801 is used to set a target bit rate before coding of moving pictures is initiated. Further, the generated bit rate calculator 802 is used to calculate a real bit rate from a generated code quantity of each frame counted by the code quantity counter 301. The target bit rate set by the target bit rate setting unit 001 and the real bit rate obtained by the generated bit rate calculator 802 are both input to the function setting unit A 304.

When the real bit rate is larger than the target bit rate, the function setting unit A 304 changes a function setting so that the slope α of the straight line B becomes smaller. In this case, the slope α is reduced by multiplying it with 0.9, and a straight line B' having such a slope is used in place of the straight line B. As described above, by reducing the slope of the line and therefore switching a straight line B to a straight line B', the desired generated code quantity in frame 225 is reduced from S13 to S14. Therefore, the generated code quantity Sg after frame 225 is totally reduced in comparison with the case of using the straight line B, and the real bit rate further approaches the target bit rate.

Further, when the real bit rate is smaller than the target bit rate, change is performed so that the slope α of the straight line B becomes larger. As for such function setting method in which the setting is realized by changing the slope of the straight line B, any method can be sued as long as the slope α of the straight line B is reduced when the real bit rate is larger than the target bit rate while the slope α is increased when the real bit rate is smaller than the target bit rate. For example, the above-described function setting can be changed by a setting method in which the slope α of the straight line B is reduced by multiplying it with 0.9 when the real bit rate is larger than the target bit rate, whereas the slope α of the straight line B is increased by multiplying it with 1.1 when the real bit rate is smaller than the target bit rate. Furthermore, when the target bit rate is Tt and the real bit rate is Tg, it is possible to change the slope α using a ratio between the target bit rate Tt and the real bit rate Tg, by formula 7:

$$\alpha' = \frac{Tt}{Tg} \times \alpha \qquad \text{[Formula 7]}$$

wherein α indicates the slope of the straight line B before the change, and α' indicates the slope of the straight line B after the change. Although in formula 7 a ratio between the target bit rate Tt and the real bit rate Tg is reflected in the change of the slope α of the straight line B directly, it is possible to change a ratio between the target bit rate Tt and the real bit rate Tg by formulas 8 and 9, and then reflect the obtained value to the change of the slope α of the straight line B.

$$\alpha' = \left(\frac{Tt}{Tg}\right)^2 \times \alpha \qquad \text{[Formula 8]}$$

$$\alpha' = \left\{\left(\frac{\frac{Tt}{Tg} - 1}{4}\right) + 1\right\} \times \alpha \qquad \text{[Formula 9]}$$

The function setting unit B 305 sets, as a function g, a hyperbola G passing through a point i (Q12, S12) on a graph with Qg as an abscissa and Sg as an ordinate shown in FIG. 9, using the quantization scale n one GOP unit Q12 and the generated code quantity in one GOP unit S12 which are both output from the unit time information calculator 303. The quantization scale deciding unit 306 obtains an intersection j (Q13, S13) of the straight line B' and the hyperbola G. The quantization scale deciding unit 306 outputs this Q13 to the quantizer 105 as a quantization scale for coding frame 225. For the frames in one GOP with frame 225 as a first frame, which corresponds to one picture, the same operations performed in the first embodiment are repeated using the straight line B'. More specifically, frame M is coded in the following procedure: the code quantity counter 301 counts the respective intra-frame generated code quantities of an I picture, a P picture, and a B picture immediately before frame M, and these values are represented as Si, Sp, and Sb; the average quantization scale calculator 302 calculates the average values of the respective intra-frame quantization scales of these pictures, and these values are represented as Qi, Qp, and Qb, respectively; the unit time information calculator 303 obtains Sg, Zg, and Qg from these values of Si, Sp, Sb, Qi, Qp, and Qb using formula 1 to 3; and the quantization scale deciding unit 306 obtains an intersection of a prescribed straight line B' set by the function setting unit A 304 and a hyperbola G passing through a point (Qg, Sg) and being set by the function setting unit B 305 and outputs the value of the Qg of the intersection to the quantizer 105 as the quantization scale of frame M; and then a comparison between a target bit rate and a real bit rate is performed to change the slope α of the straight line B as desired, when coding of next GOP is initiated, that is, immediately before coding of I picture.

As described above, according to the fourth embodiment, the moving picture coding apparatus includes a code quantity controller 106 which comprises a code quantity counter 301, an average quantization scale calculator 302, a unit time information calculator 303, a function setting unit A 304 as a first function setting unit, a function setting unit B 305 as a second function setting unit, a quantization scale deciding unit 306, a target bit rate setting unit 801, and a generated bit rate calculator 802, and this apparatus performs control by setting a quantization scale as shown in FIG. 9, in such a way that a relation between an average quantization scale in one GOP unit Qg and a generated code quantity in one GOP unit Sg is always represented as the straight line B or B'. Therefore, it is possible not only to allocate an appropriate code quantity corresponding to the amount of information included in a frame of an input picture, but to perform control so that the bit rate which is obtained in total matches a target bit rate.

Although in the fourth embodiment we describe a method in which the slope α of the straight line B is changed based on a difference between the target bit rate and the real bit rate, changing the slope α of the straight line B is realized by comparing the absolute value of a difference between a target bit rate and a real bit rate with a predetermined value, and changing the slope α only when the value exceeds the predetermined value.

In the fourth embodiment, the real bit rate is defined as a value obtained at the start of the coding, but the real bit rate is not limited to this example and it is possible to use a bit rate obtained at a predetermined time immediately before the slope of the function is changed by the function setting unit A 304.

In any of the first to fourth embodiments, the function f set by the function setting unit A 304 is a straight line B, a function D determining the maximum and minimum generated code quantities for the straight line B, or a straight line B', but the function f is not limited to these examples and it is also possible to perform the same control by using an other arbitrary function.

In any of the first to fourth embodiment, for controlling frame m to be coded, a generated code quantity in one GOP unit Sg and average quantization scale in one GOP unit Qg are obtained in an approximation method using conversion, form the respective generated code quantities and average quantization scales of an I frame, a P frame, and a B frame immediately before frame M as a coding object, using formulas 1 to 3. The actual control, however, may be performed based on the respective generated bit quantities and respective average quantization scales of the frames corresponding to one GOP immediately before the target frame.

Furthermore, any of the first to fourth embodiments describes a method of obtaining a new quantization scale from a generated code quantity in one GOP unit Sg and an average quantization scale in one GOP unit Qg. However, the same control can be performed by using a generated code quantity and average quantization scale in an arbitrary length of time, in spite of a generated code quantity and average quantization scale each in one GOP unit.

Embodiment 5.

A moving picture coding apparatus according to a fifth embodiment of the present invention is used to receive TV signals, subject them to variable bit rate coding in real time processing, and record the result of the coding in a recording medium.

FIG. 10 is a block diagram illustrating a configuration of a moving picture coding system according to the fifth embodiment of the present invention. As shown in the figure, the moving picture coding system of the fifth embodiment comprises a moving picture input means 1001, a moving picture variable bit rate coding apparatus 100, and an output managing means 1002. The output managing means 1002 is connected to a hard disk 1003 and a DVD 1004 as recording media, and a transmission line 1005 as a transmission medium, and manages data transmission to them.

In this figure, the moving picture input means 1001 comprises an antenna, a tuner, and an A/D conversion circuit, and receives a TV signal S1011 to output a digital input picture S1012. The moving picture variable bit rate coding apparatus 100 is identical to the moving picture coding apparatus 100 of the first embodiment. This apparatus is implemented by consumer AV appliances of a combination of such AV appliances and general personal computers, and performs variable bit rate coding to an input picture in a real time processing in response to the input of the input picture, outputting resultant bit streams as coded data S1013. The output managing means 1002 stores the coded data S1013 into recording media such as the hard disk 1003 and the DVD 1004, or transmits the coded data to network system through the transmission line 1005.

Here, a description is given of the operations of the thus configured moving picture coding system of the fifth embodiment for receiving TV signals, performing coding processing, and recording or transmitting the resultant coded data.

When a TV signal including a moving picture S1011 is input to the moving picture input means 1011 via an antenna, a desired signal is selected from the input signal by a tuner and subjected to conversion by an A/D conversion circuit. As a result, an input picture S1012 as a contiguous sequence of still pictures (frame pictures) as shown in FIG. 2(a) is generated and output to the moving picture variable bit rate coding apparatus 100.

As described above, the moving picture variable bit rate coding apparatus 100 is identical to the moving picture coding apparatus of the first embodiment, and performs variable bit rate coding in real time in response to the input of an input picture S1012 in the same operations performed in the first embodiment, to output resultant bit streams to the output managing means 1002 as coded data S1013. Therefore, as in the first embodiment, coded data S1013 compressed in high compression ratio and having superior picture quality is output to the output managing means 1002.

The output managing means 1002 stores the coded data S1013 obtained into recording media such as a hard disk 1003 and a DVD 1004 or transmits the data to network system through a transmission line 1005, according to settings or instructions. When a coded data S1013 is transmitted, it is stored into a recording medium or the like or decoded and reproduced by a computer system connected to the moving picture coding system via the network system.

As described above, the moving picture coding system according to the fifth embodiment comprises a moving picture input means 1001, a moving picture variable bit rate coding apparatus 100, and an output managing means 1002, and thus this apparatus can perform variable bit rate coding in real time as soon as the input of a TV signal including a moving picture is input and record or transmit the resultant coded data. Therefore, this enables to perform coding processing in response to reception of TV and recording of coded data by consumer AV appliances or a combination of such AV appliances and personal computers.

What is claimed is:

1. A moving picture variable bit rate coding apparatus receiving digitized moving pictures, and subjecting the pictures to a coding processing according to a variable bit rate method, in a real time processing in response to the input of the picture, to generate bit streams, said coding apparatus comprising:
   a blocking means for dividing each picture included in the input moving picture into blocks to generate blocked data;
   a picture conversion means for subjecting the blocked data to conversion processing to generate a conversion coefficient;
   a quantization means for performing quantization processing to the conversion coefficient using a quantification scale to generate a quantized conversion coefficient;
   a bit stream generating means for generating bit stream from the quantized conversion coefficient; and
   a code quantity control means for setting a function for control, using a generated code quantity which is a quantity of bit stream generated in a unit time and an average quantization scale obtained as a value indicating an average of the quantization scales per unit time, and, by arithmetic operation using the set function, obtaining a quantization scale to be used for the quantization processing and then outputting the quantization scale to the quantization means.

2. The moving picture variable bit rate coding apparatus defined in claim 1 wherein the code quantity control means comprises:
   a code quantity counting means for obtaining a generated code quantity by counting a quantity of code generated in each picture included in the moving picture based on the bit streams generated by the bit stream generating means:
   an average quantization scale calculating means for obtaining an average quantization scale of each picture from the quantization scales used for the quantization;
   a unit time information calculating means for obtaining a generated code quantity per unit time S1 and an average quantization scale per unit time Q1, using the generated code quantity and the average quantization scale;
   a first function setting means for setting a function f:S=f(Q) which indicates a relation between a generated code quantity per unit time (S) and an average quantization scale per unit time (Q), before the coding is started;
   a second function setting unit for setting a function g:S=g(Q) which passes through a point (S1, Q1), using the generated code quantity per unit time S1 and the average quantization scale per unit time Q1; and
   a quantization scale deciding means for obtaining a value of Q which satisfies the both functions f and g, using the generated code quantity per unit time S1 and the average quantization scale per unit time Q1, and outputting the value of Q to the quantization means as a quantization scale.

3. The moving picture variable bit rate coding apparatus defined in claim 1 wherein the code quantity control means comprises:
   a code quantity counting means for obtaining a generated code quantity by counting a quantity of code generated in each picture included in the moving picture based on the bit streams generated by the bit stream generating means;
   an average quantization scale calculating means for obtaining an average quantization scale of each picture from the quantization scales used for the quantization;
   a unit time information calculating means for obtaining a generated code quantity per unit time S1 and an average quantization scale per unit time Q1, using the generated code quantity and the average quantization scale;
   a first function setting means for setting a function f:S=f(Q) which indicates a relation between a generated code quantity per unit time (S) and an average quantization scale per unit time (Q), before the coding is started;
   a second function setting means for setting a function g:S=g(Q) which passes through a point (S1, Q1), using the generated code quantity per unit time S1 and the average quantization scale per unit time Q1, and then setting a function h represented as a tangent being tangent to the function g at the point (S1, Q1); and
   a quantization scale deciding means for obtaining a value of Q which satisfies the both functions f and h, from the generated code quantity per unit time S1 and the average quantization scale per unit time Q1, and outputting the value of Q to the quantization means as a quantization scale.

4. The moving picture variable bit rate coding apparatus defined in claim 1 wherein the code quantity control means comprises:
   a target bit rate setting means for setting a target bit rate which is a bit rate as a target in the coding apparatus, until the coding is started;
   a generated bit rate calculating means for obtaining a generated bit rate which is a bit rate for generated bit streams based on the bit streams generated by the bit stream generating means;
   a code quantity counting means for obtaining a generated code quantity by counting a quantity of code generated in each picture included in the moving picture based on the bit streams generated by the bit stream generating means;
   an average quantization scale calculating means for obtaining an average quantization scale of each picture from the quantization scales used for the quantization;
   a unit time information calculating means for obtaining a generated code quantity per unit time S1 and an average quantization scale per unit time Q1, using the generated code quantity and the average quantization scale;
   a first function setting means for setting a function f:S=f(Q) which indicates a relation between a generated code quantity per unit time (S) and an average quantization scale per unit time (Q), before the coding is started, and then changing the set function corresponding to a difference between the target bit rate and the generated bit rate;
   a second function setting means for setting a function g:S=g(Q) which passes through a point (S1, Q1) from the generated code quantity per unit time S1 and the average quantization scale per unit time Q1 which are both the outputs of the unit time information calculating means; and
   a quantization scale deciding means for obtaining a value of Q which satisfies both the function f set by the first function setting means and the function g set by the second function setting means, using the generated code quantity per unit time S1 and the average quantization scale per unit time Q1, and then outputting the value of Q to the quantization means as a quantization scale.

5. The moving picture variable bit rate coding apparatus defined in claim 1 wherein the code quantity control means sets a function f such that $f(Q1) \leq f(Q2)$ when $Q1<Q2$, as a function $f:S=f(Q)$ which indicates a relation between a generated code quantity per unit time (S) and an average quantization scale per unit time (Q).

6. The moving picture variable bit rate coding apparatus defined in claim 1 wherein the code quantity control means sets a function g such that $g(Q1) \leq g(Q2)$ when $Q1<Q1$, as a function $g:S=g(Q)$ which passes through a point (S1, Q1) obtained from a generated code quantity per unit time S1 and an average quantization scale per unit time Q1 which are obtained.

7. The moving picture variable bit rate coding apparatus defined in claim 1 wherein the code quantity control means sets a function $f(Q)=a \times Q+b$ (a is an integral real number, and b is a real number) which is expressed as a straight line, as a function $f:S=f(Q)$ which indicates a relation between a generated code quantity per unit time (S) and an average quantization scale per unit time (Q).

8. The moving picture variable bit rate coding apparatus defined in claim 4 wherein the code quantity control means sets a function $f(Q)=a \times Q+b$ (a is an integral real number and b is a real number), as a function $f:S=f(Q)$ which indicates a generated code quantity per unit time (S) and an average quantization scale per unit time (Q), and changes the setting of the function f such that the slope of the function f is increased when the target bit rate is larger than the generated bit rate while changing the setting of the function f such that the slope of the function f is decreased when the target bit rate is smaller than the generated bit rate.

9. The moving picture variable bit rate coding apparatus defined in claim 1 wherein, assuming that a constant Q1 is smaller than a constant Q2, a constant S1 is smaller than a constant S2, and $S1=f(Q1)$ and $S2=f(Q2)$, the code quantity control means sets a function f such that $f(Q)=S1$ when $Q<Q1$ and $f(Q)=(S2-S1)/(Q2-Q1) \times Q+(S1 \times Q2-S2 \times Q1)/(Q2-Q1)$ when $Q1 \leq Q \leq Q2$, as a function $f:S=f(Q)$ indicating a relation between a generated code quantity per unit time (S) and an average quantization scale per unit time (Q).

10. The moving picture variable bit rate coding apparatus defined in claim 1 wherein a function $g(Q)=Q1 \times S1/Q$ expressed as a hyperbola is set as a function $g:S=g(Q)$ passing through a point (S1, Q1) obtained from a generated code quantity per unit time S1 and an average quantization scale per unit time Q1 which are obtained.

11. The moving picture variable bit rate coding apparatus defined in claim 1 further comprising a signal input means for inputting signals including moving pictures from the exterior to said apparatus, and an output managing means for controlling the storage of the bit streams into a storage unit.

12. A moving picture variable bit rate coding method in which digitized moving pictures are received and subjected to a coding processing according to a variable bit rate method in a real time processing in response to the input of the pictures, said method including:

a blocking step of dividing each picture included in the input moving picture into blocks to generate blocked data;

a picture conversion step of performing conversion processing to the blocked data to generate a conversion coefficient;

a quantization step of performing quantization processing to the conversion coefficient using a quantization scale to generate a quantized conversation coefficient;

a bit stream generating step of generating bit stream from the quantized conversion coefficient; and a code quantity control step of setting a function for control, using a generated code quantity which is a quantity of bit stream generated in a unit time and an average quantization scale obtained as a value indicating an average of the quantization scales per unit time, and by arithmetic operation using the set function, obtaining a quantization scale to be used for the quantization and outputting the scale to the quantization step.

13. The moving picture variable bit rate coding method defined in claim 12 wherein the code quantity control step includes:

a code quantity counting step of obtaining a generated code quantity by counting a quantity of code generated in each picture included in the moving picture based on the bit streams generated by the bit stream generating step;

an average quantization scale calculating step of obtaining an average quantization scale of each picture from the quantization scale used for the quantization;

a unit time information calculating step of obtaining a generated code quantity per unit time S1 and an average quantization scale per unit time Q1 using the generated code quantity and the average quantization scale;

a first function setting step of setting a function $f:S=f(Q)$ indicating a relation between a generated code quantity per unit time (S) and an average quantization scale per unit time (Q) before the coding is started;

a second function setting step of setting a function $g:S=g(Q)$ passing through a point (S1, Q1), using a generated code quantity per unit time S1 and an average quantization scale per unit time Q1; and a quantization scale deciding step of obtaining a value of Q which satisfies the both functions f and g, using the generated code quantity per unit time S1 and the average quantization scale per unit time Q1, and outputting the value of Q to the quantization step as a quantization scale.

14. The moving picture variable bit rate coding method defined in claim 12 wherein the code quantity control step includes:

a code quantity counting step of obtaining a generated code quantity by counting a quantity of code generated in each picture included in the moving picture based on the bit streams generated by the bit stream generating step;

an average quantization scale calculating step of obtaining an average quantization scale of each picture from the quantization scales used for the quantization;

a unit time information calculating step of obtaining a generated code quantity per unit time S1 and an average quantization scale per unit time Q1 using the generated code quantity and the average quantization scale;

a first function setting step of setting a function $f:S=f(Q)$ which indicates a relation between a generated code quantity per unit time (S) and an average quantization scale per unit time (Q), before the coding is started;

a second function setting step of setting a function $g:S=g(Q)$ which passes through a point (S1, Q1) using the generated code quantity per unit time S1 and the average quantization scale per unit time Q1, and then setting a function h expressed as a tangent which is tangent to the function g at the point (S1, Q1); and a quantization scale deciding step of obtaining a value of Q which satisfies the both functions f and h using the generated code quantity per unit time S1 and the average quantization scale per unit time Q1, and then outputting the value of Q to the quantization step as a quantization scale.

15. The moving picture variable bit rate coding method defined in claim 12 wherein the code quantity control step includes:

a target bit rate calculating step of setting a target bit rate, which is a bit rate as a target in the coding method, before the coding is started;

a generated bit rate calculating step of obtaining a generated bit rate, which is a bit rate for generated bit stream, from the bit streams generated by the bit stream generating means;

a code quantity calculating step of obtaining a generated code quantity by counting a quantity of code generated in each picture included in the moving picture based on the bit streams generated in the bit stream generating step;

an average quantization scale calculating step of obtaining an average quantization scale of each picture from the quantization scales used for the quantization;

a unit time information calculating step of obtaining a generated code quantity per unit time S1 and an average quantization scale per unit time Q1 using the generated code quantity and the average quantization scale;

a first function setting step of setting a function f:S=f(Q) which indicates a relation between a generated code quantity per unit time (S) and an average quantization scale per unit time (Q), before the coding is started, and then changing the set function corresponding to a difference between the target bit rate and the generated bit rate;

a second function setting step of setting a function g:S=g(Q) passing through a point (S1, Q1), from the generated code quantity per unit time S1 and the average quantization scale per unit time Q1 which are both the outputs of the unit time information calculating step; and a quantization scale deciding step of obtaining a value of Q which satisfies the both functions f and g using the generated code quantity per unit time S1 and the average quantization scale per unit time Q1, and then outputting the value of Q to the quantization step as a quantization scale.

16. The moving picture variable bit rate coding method defined in claim 12 wherein, in the code quantity control step, a function f is set such that f(Q1)≦f(Q2) when Q1<Q2, as a function f:S=f(Q) indicating a relation between a generated code quantity per unit time (S) and an average quantization scale per unit time (Q).

17. The moving picture variable bit rate coding method defined in claim 12 wherein, in the code quantity control step, a function g is set such that g(Q1)≦g(Q2) when Q1<Q2, as a function g:S=g(Q) passing through a point (S1, Q1) obtained from a generated code quantity per unit time S1 and an average quantization scale per unit time Q1 which are obtained.

18. The moving picture variable bit rate coding method defined in any of claim 12 wherein, in the code quantity control step, a function f(Q)=a×Q+b (a is an integral real number, and b is a real number) expressed as a straight line is set as a function f:S=f(Q) indicating a relation between a generated code quantity per unit time (S) and an average quantization scale per unit time (Q).

19. The moving picture variable bit rate coding method defined in claim 15 wherein, in the code quantity control step, a function f(Q)=a×Q+b (a is an integral real number, and b is a real number) expressed as a straight line is set as a function f:S=f(Q) indicating a relation between a generated code quantity per unit time (S) and an average quantization scale per unit time (Q), and changes the setting of the function f such that the slope of the function f is increased when the target bit rate is larger than the generated bit rate while changing the setting of function f such that the slope of the function f is decreased when the target bit rate is smaller than the generated bit rate.

20. The moving picture variable bit rate coding method defined in claim 12 wherein, assuming that a constant Q1 is smaller than a constant Q2, a constant S1 is smaller than a constant S2, and S1=f(Q1) and S2=f(Q2), a function f is set such that f(Q)=S1 when Q<Q1 and f(Q)=(S2−S1)/(Q2−Q1)×Q+(S1×Q2−S2×Q1)/(Q2−Q1) when Q1≦Q≦Q2, as a function f:S=f(Q) indicating a relation between a generated code quantity per unit time (S) and an average quantization scale per unit time (Q).

21. The moving picture variable bit rate coding method defined in claim 12 wherein, in the code quantity control step, a function g(Q)=Q1×S1/Q expressed as a hyperbola is set as a function g:S=g(Q) which passes through a point (S1, Q1) obtained from a generated code quantity per unit time S1 and an average quantization scale per unit time Q1 which are obtained.

22. A recording medium for moving picture variable bit rate coding program used for recording a moving picture variable bit rate coding program which receives digitized moving pictures and subjects the pictures to a coding processing according to a variable bit rate method in a real time processing in response to the input of the pictures to generate bit streams, said program comprises:

a blocking step of dividing each picture included in the input moving picture into blocks to generate blocked data;

a picture conversion step of performing conversion processing to the blocked data to generate a conversion coefficient;

a quantization step of performing quantization processing to the conversion coefficient using a quantization scale to generate a quantized conversation coefficient;

a bit stream generating step of generating bit streams from the quantized conversion coefficient; and a code quantity control step of setting a function for control using a generated code quantity as a quantity of bit stream generated in a unit time and an average quantization scale obtained as a value indicating an average of the quantization scales per unit time, and by arithmetic operation using the set function, obtaining a quantization scale to be used for the quantization processing and outputting the scale to the quantization step.

23. The recording medium for moving picture variable bit rate coding program defined in claim 22 being used for recording the moving picture variable bit rate coding program in which the code quantity control step includes:

a code quantity counting step of obtaining a generated code quantity by counting the quantity of code generated in each picture included in the moving picture based on the bit streams generated by the bit stream generating step;

an average quantization scale calculating step of obtaining an average quantization scale of each picture from the quantization scales used for the quantization;

a unit time information calculating step of obtaining a generated code quantity per unit time S1 and an average quantization scale per unit time Q1 using the generated code quantity and the average quantization scale;

a first function setting step of setting a function f:S=f(Q) indicating a relation between a generated code quantity per unit time (S) and an average quantization scale per unit time (Q) before the coding is started;

a second function setting step of setting a function g:S= g(Q) passing through a point (S1, Q1), using the generated code quantity per unit time S1 and the average quantization scale per unit time Q1; and a quantization scale deciding step of obtaining a value of Q which satisfies the both functions f and g, using the generated code quantity per unit time S1 and the average quantization scale per unit time Q1, and outputting the value of Q to the quantization step as a quantization scale.

24. The recording medium for moving picture variable bit rate coding program defined in claim 22 being used for recording the moving picture variable bit rate coding program in which the code quantity control step includes:

a code quantity counting step of obtaining a generated code quantity by counting a quantity of code generated in each picture included in the moving picture based on the bit streams generated by the bit stream generating step;

an average quantization scale calculating step of obtaining an average quantization scale of each picture from the quantization scales used for the quantization;

a unit time information calculating step of obtaining a generated code quantity per unit time S1 and an average quantization scale per unit time Q1 using the generated code quantity and the average quantization scale;

a first function setting step of setting a function f:S=f(Q) which indicates a relation between a generated code quantity per unit time (S) and an average quantization scale per unit time (Q), before the coding is started;

a second function setting step of setting a function g:S= g(Q) which passes through a point (S1, Q1) using a generated code quantity per unit time S1 and an average quantization scale per unit time Q1, and then setting a function h expressed as a tangent which is tangent to the function g at the point (S1, Q1); and a quantization scale deciding step of obtaining a value of Q which satisfies the both functions f and h using the generated code quantity per unit time S1 and the average quantization scale per unit time Q1, and then outputting the value of Q to the quantization step as a quantization scale.

25. The recording medium for moving picture variable bit rate coding program defined in claim 22 being used for recording the moving picture variable bit rate coding program in which the code quantity control step includes:

a target bit rate calculating step of setting a target bit rate, which is a bit rate as a target in the coding method, before the coding is started;

a generated bit rate calculating step of obtaining a generated bit rate, which is a bit rate for generated bit stream, from the bit streams generated by the bit stream generating means;

a code quantity calculating step of obtaining a generated code quantity by counting a quantity of code generated in each picture included in the moving picture based on the bit streams generated in the bit stream generating step;

an average quantization scale calculating step of obtaining an average quantization scale of each picture from the quantization scales used for the quantization;

a unit time information calculating step of obtaining a generated code quantity per unit time S1 and an average quantization scale per unit time Q1 using the generated code quantity and the average quantization scale;

a first function setting step of setting a function f:S=f(Q) which indicates a relation between a generated code quantity per unit time (S) and an average quantization scale per unit time (Q), before the coding is started, and then changing the set function corresponding to a difference between the target bit rate and the generated bit rate;

a second function setting step of setting a function g:S= g(Q) passing through a point (S1, Q1), from the generated code quantity per unit time S1 and the average quantization scale per unit time Q1 which are both the outputs of the unit time information calculating step; and a quantization scale deciding step of obtaining a value of Q which satisfies the both functions f and g using the generated code quantity per unit time S1 and the average quantization scale per unit time Q1, and then outputting the value of Q to the quantization step as a quantization scale.

26. The recording medium for moving picture variable bit rate coding program defined in claim 22 being used for recording the moving picture variable bit rate coding program wherein, in the code quantity control step, a function f is set such that $f(Q1) \leq f(Q2)$ when $Q1<Q2$, as a function f:S=f(Q) indicating a relation between a generated code quantity per unit time (S) and an average quantization scale per unit time (Q).

27. The recording medium for moving picture variable bit rate coding program defined in claim 22 being used for recording the moving picture variable bit rate coding program wherein, in the code quantity control step, a function g is set such that $g(Q1) \leq g(Q2)$ when $Q1<Q2$, as a function g:S=g(Q) which passes through a point (S1, Q1) obtained from a generated code quantity per unit time S1 and an average quantization scale per unit time Q1 which are obtained.

28. The recording medium for moving picture variable bit rate coding program defined in claim 22 being used for recording the moving picture variable bit rate coding program wherein, in the code quantity control step, a function $f(Q)=a \times Q+b$ (a is an integral real number, and b is a real number) expressed as a straight line is set as a function f:S=f(Q) indicating a relation between a generated code quantity per unit time (S) and an average quantization scale per unit time (Q).

29. The recording medium for moving picture variable bit rate coding program defined in claim 25 being used for recording the moving picture variable bit rate coding program wherein, in the code quantity control step, a function $f(Q)=a \times Q+b$ (a is an integral real number, and b is a real number) expressed as a straight line is set as a function f:S=f(Q) indicating a relation between a generated code quantity per unit time (S) and an average quantization scale per unit time (Q), and the setting of the function f is changed such that the slope of the function f if increased when the target bit rate is larger than the generated bit rate while the function f is changed such that the slope of the function f is decreased when the target bit rate is smaller than the generated bit rate.

30. The recording medium for moving picture variable bit rate coding program defined in claim 22 being used for recording the moving picture variable bit rate coding program wherein, in the code quantity control step, assuming that a constant Q1 is smaller than a constant Q2, a constant S1 is smaller than a constant S2, and S1=f(Q1) and S2=f(Q2), a function f is set such that f(Q)=S1 when Q<Q1 and f(Q)=(S1−S1)/(Q2−Q1)×Q+(S×Q2−S2×Q1)/(Q2−Q1) when Q1≦Q≦Q2, as a function f:S=f(Q) indicating a relation between a generated code quantity per unit time (S) and an average quantization scale per unit time (Q).

31. The recording medium for moving picture variable bit rate coding program defined in claim 22 recording the moving picture variable bit rate coding program wherein, in the code quantity control step, a function g(Q)=Q1×S1/Q expressed as a hyperbola is set as a function g:S=g(Q) which passes through a point (S1, Q1) obtained from the generated code quantity per unit time S1 and the average quantization scale per unit time Q1.

* * * * *